United States Patent
Mihály et al.

(10) Patent No.: US 8,767,728 B2
(45) Date of Patent: Jul. 1, 2014

(54) TUNNEL GATEWAY MANAGED CACHING ARCHITECTURE

(75) Inventors: Attila Mihály, Dunakeszi (HU); András Császár, Budapest (HU); Lars Westberg, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 481 days.

(21) Appl. No.: 13/037,705

(22) Filed: Mar. 1, 2011

(65) Prior Publication Data

US 2012/0224578 A1    Sep. 6, 2012

(51) Int. Cl.
*H04L 12/28*    (2006.01)
*H04L 12/56*    (2006.01)

(52) U.S. Cl.
USPC ........... 370/389; 370/392; 370/396; 370/397; 370/398; 370/399

(58) Field of Classification Search
None
See application file for complete search history.

(56) References Cited

U.S. PATENT DOCUMENTS

| | | | | |
|---|---|---|---|---|
| 7,499,401 B2 * | 3/2009 | Buddhikot et al. | ........... | 370/235 |
| 7,562,393 B2 * | 7/2009 | Buddhikot et al. | ........... | 726/26 |
| 8,174,982 B2 * | 5/2012 | Buddhikot et al. | ........... | 370/235 |
| 8,332,914 B2 * | 12/2012 | Buddhikot et al. | ........... | 726/4 |

OTHER PUBLICATIONS

3GPP TS 29.281 V9.3.0; 3rd Generation Partnership Project; Technical Specification Group Core Network and Terminals; General Packet Radio System (GPRS) Tunnelling Protocol User Plane (GTPv1-U) (Release 9), Jun. 2010 (24 pages).
3GPP TS 22.101 10.1.0; 3rd Generation Partnership Project; Technical Specification Group Services and System Aspects; Service aspects; Service principles (Release 10), Dec. 2009 (60 pages).
3GPP TR 23.829 V0.4.0; 3rd Generation Partnership Project; Technical Specification Group Services and System Aspects; Local IP Access and Selected IP Traffic Offload (Release 10), Jan. 2010 (29 pages).

* cited by examiner

*Primary Examiner* — Ayaz Sheikh
*Assistant Examiner* — Blanche Wong
(74) *Attorney, Agent, or Firm* — Nixon & Vanderhye, P.C.

(57) ABSTRACT

In an access network, a tunnel gateway (TGW) managed network caching architecture is proposed. The proposed TGW receives a terminal request directed to a data server for a flow of data. The terminal request is forwarded to the TGW through a tunnel from a tunnel endpoint located below the TGW. The TGW selects a network cache to handle the data traffic of the flow requested by the requesting terminal. The TGW then redirects the terminal request to the selected network cache to provide the requested service. The TGW redirects the terminal request through a tunnel whose endpoint is the selected network cache.

34 Claims, 14 Drawing Sheets

TUNNEL GATEWAY MANAGED CACHING ARCHITECTURE

TECHNICAL FIELD

Technical field of present disclosure relates to method, apparatus and system for caching on access networks.

BACKGROUND

In a 3GPP access network, to enable the communication of a user equipment (UE) or a terminal to the external world, a PDN (Packet Data Network) connection is established, and a PGW (PDN Gateway) is selected for the PDN connection. As seen in FIG. 1, the PGW for the UE is selected by a serving MME (Mobility Management Entity) and it remains the same for the lifetime of the PDN connection. The PGW allocates an IP address for the UE and acts as the IP point of presence, i.e. all traffic to and from the UE is tunneled to the selected PGW. Inter-working with legacy 2G and 3G networks is achieved by defining an interface (S4) for 2G/GPRS (General Packet Radio Service) traffic and control signaling between a SGSN (Serving GPRS Support Node) and a SGW (Serving Gateway), as well as a direct tunnel interface (S12) between a RNC (Radio Network Controller) and the TGW for UTRAN (Universal Terrestrial Radio Access Network) UP traffic.

In many cases, the path of the traffic over the PDN connection continues from the PGW to the operator's service network or to an ASBR (Autonomous System Border Router), i.e. one of the operator's border routers constituting a peering point with other carriers, and further into the Internet.

In SAE/LTE (System Architecture Evolution/Long Term Evolution) networks, user packets travel through a significant portion of the access network encapsulated in a GTP-U (GPRS Tunnelling Protocol—User Data Tunnelling) tunnel. The GTP header of the incoming packet, especially one of its fields, the TEID (Tunnel Endpoint Identifier) is used in combination with the tunnel endpoint's IP address to explicitly identify a bearer of the terminal.

In SAE/LTE, the SGW and the base station use the TEID in the received packet's GTP header to forward the packet to the appropriate bearer. Based on the incoming TEID, the SGW selects a GTP or PMIP (Proxy Mobile IP) based tunnel leading to the PGW. Based on the incoming TEID, the eNodeB selects the appropriate radio bearer (leading to a specific terminal).

There are two alternative tunnelling possibilities between the SGW and the PGW. One is GTP tunnelling similarly as between the RBS (Radio Base Station) and SGW, and the other is using PMIP with GRE (Generic Routing Encapsulation) tunnelling.

In 3G networks, GTP is used between the SGSN and the RNC as well as between the SGSN and GGSN (Gateway GPRS Support Node). Based on the incoming TEID, the SGSN selects a GTP tunnel leading to the GGSN. Based on the incoming TEID, the RNC selects the appropriate radio bearer leading to a specific terminal through an appropriate NodeB. Alternatively, in the direct tunnel solution, GTP tunnelling is used directly between the RNC and GGSN. In EPC (Evolved Packet Core) networks, the traffic from 2G/3G access and SGW is also transported in GTP tunnels.

This tunnel-based forwarding mechanism is needed because the IP address does not necessarily identify the terminal unambiguously. In many cases, the terminal is allocated a local address that is later translated to a globally unique address by the PGW, thus it may easily happen that two terminals attached to the same RBS have the same IP address.

Lately with the introduction of broadband mobile technologies and change of subscriber behaviour shifting towards more high volume media download, coping with increased traffic volume in a mobile RAN (Radio Access Network) has become a problem. One possibility to off-load the access is to apply caches that would serve some parts of the requested content such as media, web, etc. In this way, it is possible to achieve transport gain above the cache. Additional benefits of RAN caching is the possibility for QoS/QoE enhancement by reducing transport delays and also reduced peering cost.

One relevant activity is the offload architectures for selected traffic such as the Internet traffic towards a defined IP network close to the terminal's point of attachment to the access network. A motivation for this requirement, together with the similar requirement for local IP access (LIPA) for the home (e)NodeB subsystem, is to decrease operator expenses, because in many cases it would be suboptimal to carry the traffic all way up to a central PGW, especially if that traffic may be offloaded locally at lower costs to a local service network or to the Internet.

Technical solutions for achieving SIPTO (Selected IP Traffic Offload) have been discussed and introduced into 3GPP standards. For Release 10, it has been decided that two main alternatives will be supported. One is based on selection of a closer PGW for specific types of traffic, and another is based on traffic breakout from the GTP tunnels on the Tu interface.

The advantage of the first conventional solution is that the traffic break-out, including break-out for caching purposes, may be achieved by architectural solutions that do not require significant changes to the current 3GPP architecture. However, it is questionable that designing small nodes with PGW functionality is economically feasible. Also, it may be problematic to provide secure network environment for these distributed GWs, whose functions (legal intercept, charging, policy enforcement) require such an environment.

The second conventional solution generally involve a type of a NAT (Network Address Translator) to be able to offload traffic from a tunnel below the IP point of presence. A similar solution is based on an enhanced NATting solution involving encapsulation and decapsulation based on the information stored in an extended NAT mapping table. However, this conventional solution does not deal with a number of related issues such as getting the tunnel information during attach and mobility. Addressing these issues would require a number of additional proprietary functions in the system, including intercepting mobility signalling messages, or interfacing to certain nodes to get required tunnel information.

SUMMARY

A non-limiting aspect of the disclosed subject matter is directed to a method to implement network caching in an access network, the method being performed by a tunnel gateway (TGW) of the access network. In the method, the TGW receives a terminal request directed to a data server for a flow of data. The terminal request, which originates from a terminal, is forwarded to the TGW by a DL endpoint through a FROM-DL tunnel. The DL endpoint, which is a tunnel endpoint of the FROM-DL tunnel, is below the TGW. Based on the FROM-DL tunnel, the TGW selects a network cache to handle the flow for the requesting terminal. The TGW then redirects the terminal request to the selected network cache through a TO-SELECTED-CACHE tunnel in which the selected network cache is the tunnel endpoint of the TO-SELECTED-CACHE tunnel.

Another non-limiting aspect of the disclosed subject matter is directed to a tunnel gateway (TGW) of an access network. The TGW comprises a tunnel switch that is arranged to receive a terminal request directed to a data server for a flow of data. The terminal request, which originates from a terminal, is forwarded to the TGW by a DL endpoint through a FROM-DL tunnel. The DL endpoint, which is a tunnel endpoint of the FROM-DL tunnel, is below the TGW. The tunnel switch is also arranged to select, based on the FROM-DL tunnel, a network cache to handle the flow for the requesting terminal. The tunnel switch is further arranged to redirect the terminal request to the selected network cache through a TO-SELECTED-CACHE tunnel. The selected network cache is an endpoint of the TO-SELECTED-CACHE tunnel.

Yet another non-limiting aspect of the disclosed subject matter is directed to a non-transitory computer storage medium which has stored therein programming instructions. When a computer executes the programming instructions, the computer executes the above described method to implement network caching in an access network.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1:
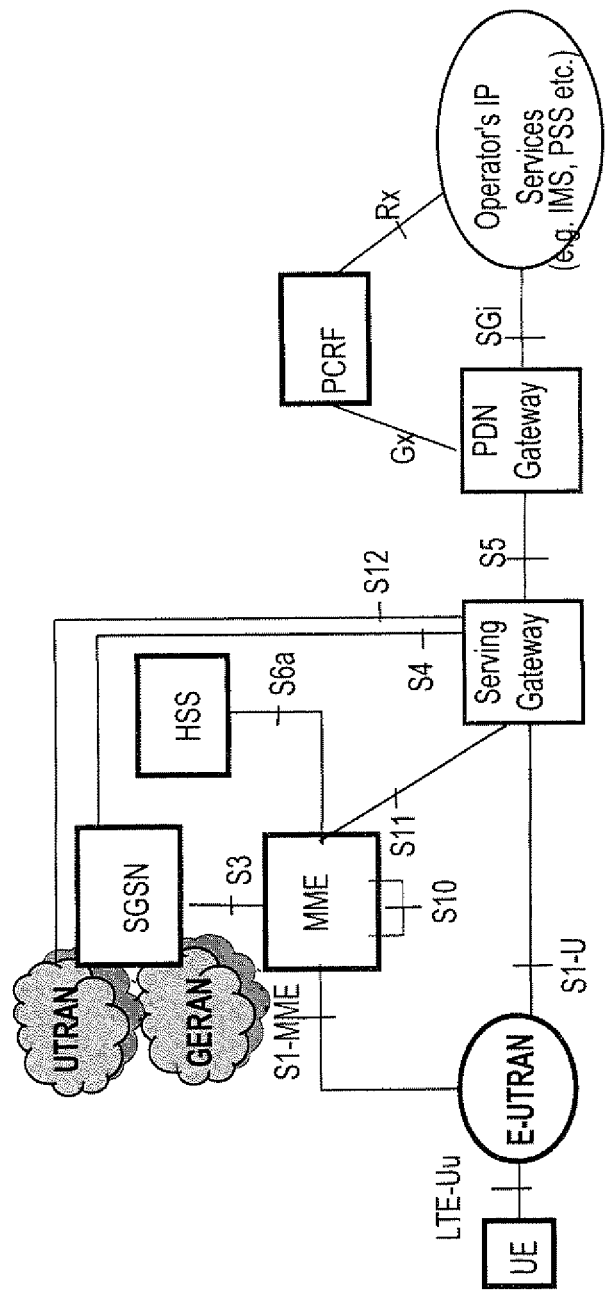
FIG. 1 illustrates an example 3GPP network architecture.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes and methods which may be substantially represented in computer program product and executed by a computer or processor, whether or not such computer or processor is explicitly shown. The computer program product may be loadable to the computer or may be stored in a non-transitory computer readable medium.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP is primarily used as examples for explanation purposes. However, the scope of this disclosure is not limited to the set of 3GPP wireless network systems and can encompass many domains of wireless network systems. The scope can also encompass many types of tunneling including GTP and PMIP with GRE tunneling. The latter is also based on per-UE tunnels where the identifiers are different. However, the concepts disclosed in this document can work similarly. Thus, while PMIP tunnels will not be specifically discussed, it should be kept in mind that the scope of the discussion is applicable to PMIP as well as to other tunnels.

As indicated in the background section, there is more demand for high volume media download from the subscribers. One way to cope with the increased traffic volume is to apply network caches to off-load network access, and thus, achieve transport gain above the network cache. By "above", this refers to the transport that takes place between the network cache and the PGW.

However, below the network cache—between the network cache and the UE—little to no transport gain is expected. In addition, the transport cost is typically the highest and transport bottleneck problems arise at the low-RAN, which is the transport closer to the RBSs. The "last mile" links are generally the most expensive. Thus, when possible, it is preferred to move the network caches as close to the RBSs as possible.

In the background section, it is also indicated that the conventional solutions to achieve SIPTO present problems themselves. It may not be economically feasible to implement the solution based on a selection of a closer PGW for specific types of traffic. There may also be security problems associated with this conventional solution which is based on the traffic breakout from the GTP tunnels on the Iu interface. This and other similar solutions are likely to require proprietary system functions which go against the one of the purposes of standardization.

In one or more aspects of the present disclosure, a lightweight caching architecture is proposed that allows for caching below the IP point of presence and also makes use of the functionality and mobility knowledge in a tunnel gateway (TGW). Here, the term tunnel gateway is used to generically refer to network architectures with "tunnel switching" nodes or functions. An example of a TGW is the SGW in 3 GPP.

The IP point of presence refers to the point in the network where the packets to the host are routed to. In the mobile case, the point of presence may be the GGSN/PGW, and in the fixed case, this may be the BRAS/BNG. The proposed caching architecture can be completely managed by the TGW.

For this, the following entities are proposed:
Tunnel switch that selects packets to be redirected towards the network cache and determines the destination tunnel of the packets coming from the different directions based on information stored in a mapping database. The tunnel switch also updates the mapping database with information of ongoing flows in a different tunnel redirected to a specific network cache;
Controller that connects a given terminal to a given network cache; and
Mapper that maintains, in addition to the usual tunnel mapping information (mapping to the GTP tunnels from the RBS to the PGW and vice versa), information about ongoing flows in different tunnels redirected to the network cache as well as identifiers of the specific network cache.

The proposed entities may be implemented in any combination of hardware, software, and firmware. The functions that the entities perform may be stored as program instructions downloadable from a storage server or stored in a non-transitory storage medium.

In a non-limiting aspect, the proposed entities and the TGW are such that from the perspective of other nodes of the access network such as the MME, PGW, RNC, etc., there is no change in how the TGW performs its functions. In other words, little to no modification is required in these other nodes and the TGW appears to function as a normal SGW. But in some circumstances, slight modifications in some of these other nodes may result in further improvements. Thus, it is contemplated that minor modifications may be made to other network nodes.

Figure 2:
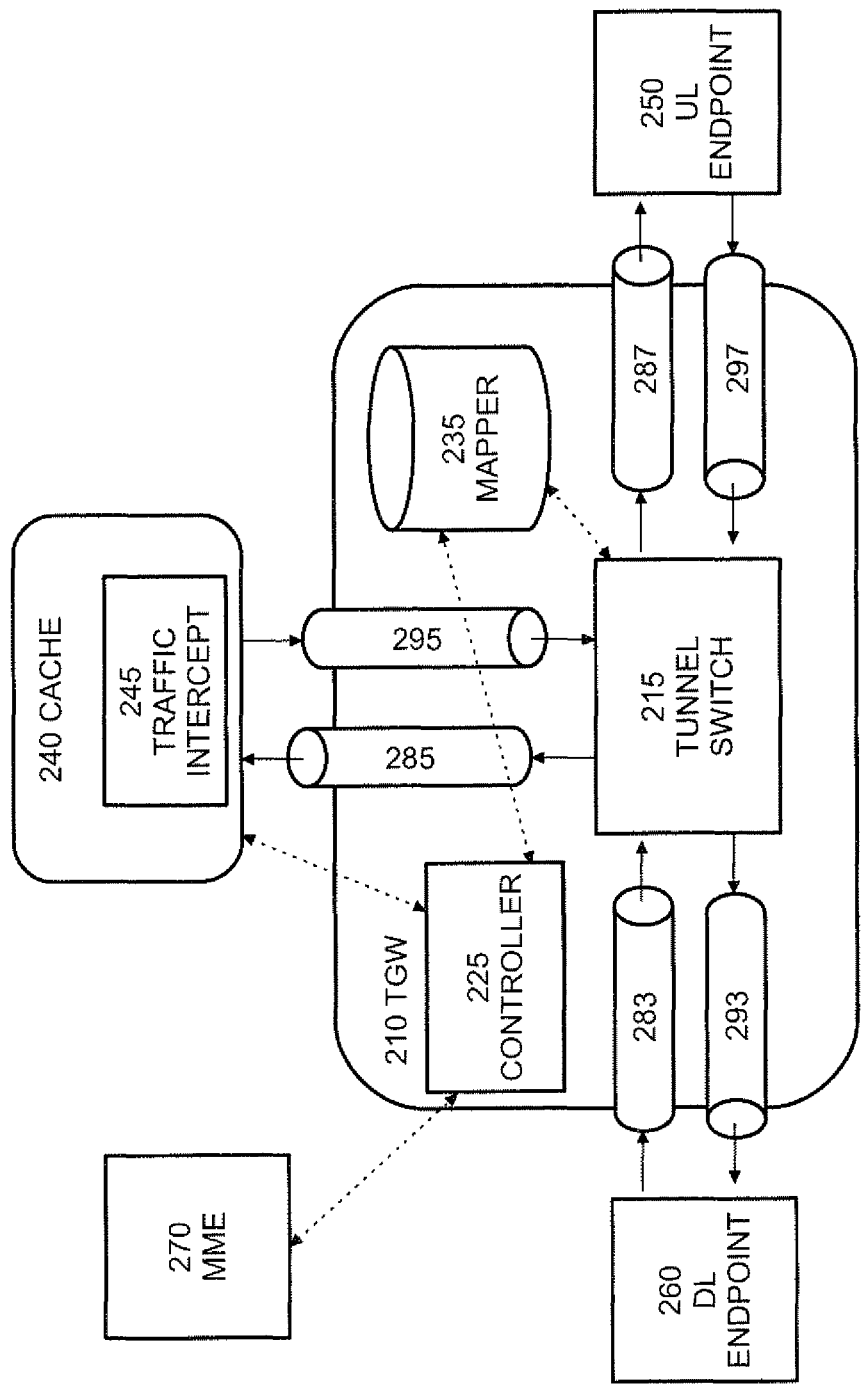
FIG. 2 illustrates an example access network caching architecture.

An example of the proposed architecture is illustrated in FIG. 2. In this figure, control relations between different entities are represented by dashed arrows, while continuous arrows represent possible data plane paths. In this figure, the tunnel switch 215, the controller 225, and the mapper 235 are all illustrated to be within the TGW 210, i.e., all are entities of the TGW. However, this should not taken to be limiting. None, some, or all entities may be implemented external to the TGW. It is only necessary that the entities maintain an association with the TGW. In FIG. 2, the network cache 240 is illustrated to be external to the TGW. While this is preferred, it is entirely within the scope of this disclosure that the network cache can be a part of the TGW.

Cylinders represent tunnels and the arrows indicate the direction of information flow in the tunnel. The direction is also indicated by the visible open ends of the cylinders. Cylinders 283 and 287 represent tunnels in the uplink direction from a downlink (DL) endpoint 260 to an uplink (UL) endpoint 250. Note that relative to the TGW 210, the DL endpoint 260 (e.g., RBS, RNC, SGSN, etc.) is located below the TGW 210 in the data path, and the tunnel 283 is used by the TGW 210 to receive tunnel messages from the DL endpoint. Thus, the tunnel 283 is referred to as a "from-lower tunnel" to indicate that the tunnel is used to receive tunnel messages from endpoints located below the TGW 210, and the DL endpoint 260 is referred to as a "lower endpoint" to indicate the endpoint corresponding to the from-lower tunnel.

Conversely, the UL endpoint 250 (e.g. PGW) is located above the TGW 210 and the tunnel 287 is used by the TGW 210 to send tunnel messages to the UL endpoint 250. Thus, the UL endpoint 250 and the tunnel 287 are referred to as "upper endpoint" and "to-upper tunnel," respectively.

Cylinders 297 and 293 represent tunnels in the downlink direction from the UL endpoint 250 to the DL endpoint 260 and are respectively referred to as "from-upper" and "to-lower" tunnels. Also, cylinders 285 and 295 are referred to as "to-cache" and "from-cache" tunnels to indicate that they are tunnels used by the TGW 210 to send and receive tunnel messages to and from the network cache 240.

Figure 3:
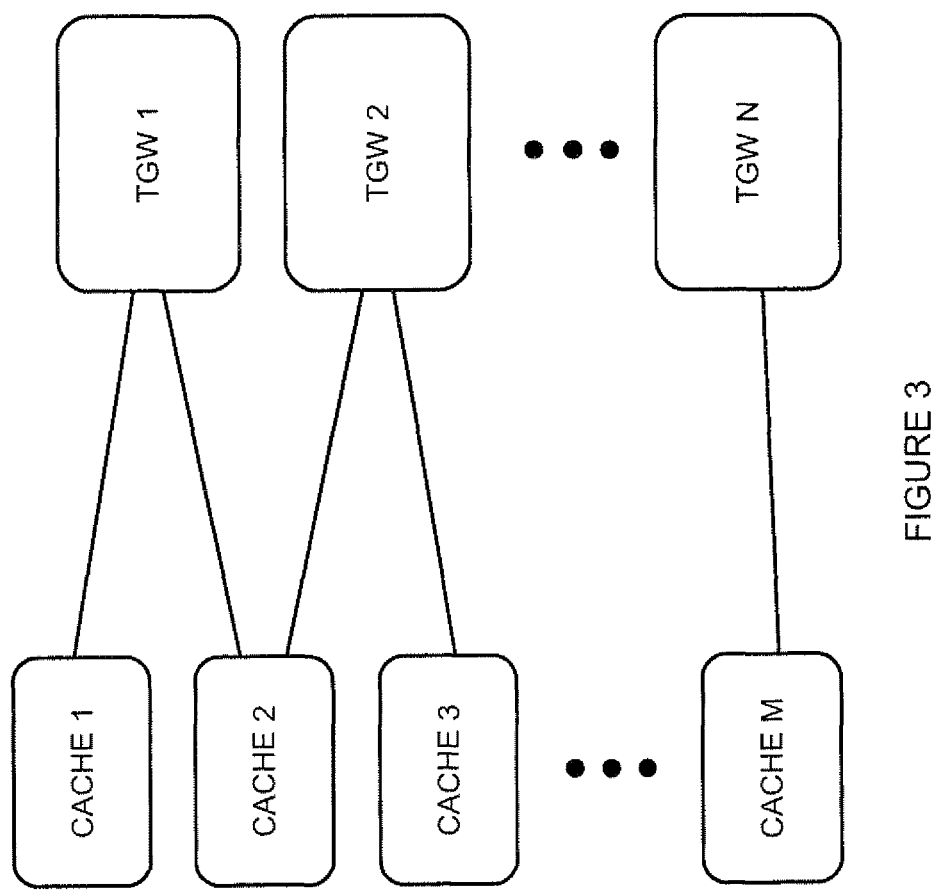
FIG. 3 illustrates example mappings between network caches and tunnel gateways.

It should be noted that FIG. 2 is a relatively simple view of the proposed access network caching architecture in that one network cache and one TGW are illustrated. But in actuality, it is expected that there will be multiple network caches and multiple TGWs as illustrated in FIG. 3. Also as illustrated, each individual network cache may be mapped to a single or to multiple TGWs, and each TGW may be mapped to a single or to multiple network caches. One preferred mapping is one-to-one from the perspectives of the network caches and one-to-many from the perspectives of the TGWs. When this occurs, there will be a plurality of to-cache and from-cache tunnels for the TGW due to multiple network caches being mapped to the TGW. It should be noted that even with one network cache, there can also be multiple tunnels in both directions with each tunnel serving different flows.

While one-to-one mapping is preferred from the perspective of the network caches, but as will be explained below, the network caches near or at borders of service areas of two or more TGWs may be associated with two or more TGWs for mobility handling purposes.

In the following, descriptions of the different entities and the functions they perform are provided. The descriptions and figures are given with reference to the EPC network as an example. But it should be noted that the concepts presented may be applied in other contexts such as in pure 2G/3G networks.

Mapping Database

A mapping database for the proposed network caching architecture is first described. One function that a conventional SGW performs is to direct the traffic belonging to the same bearer between the different tunnels from the PGW and the RBS/SGSN, and vice versa. This is done using a conventional mapping table shown below in Table 1.

TABLE 1

| S-IP$_1$ | TEID-Up$_{S1}$ | R-IP$_1$ | TEID-Up$_{R1}$ |
| S-IP$_1$ | TEID-Dn$_{S1}$ | R-IP$_1$ | TEID-Dn$_{R1}$ |
| S-IP$_2$ | TEID-Up$_{S2}$ | R-IP$_2$ | TEID-Up$_{R2}$ |
| S-IP$_2$ | TEID-Dn$_{S2}$ | R-IP$_2$ | TEID-Dn$_{R2}$ |
| ... | ... | ... | ... |

In Table 1, the S-IPs represent IP addresses of uplink tunnel endpoints, i.e., upper endpoints, such as the PGW. Conversely, the R-IPs represent IP addresses of downlink tunnel endpoints, i.e., lower endpoints, such as the eNodeB or the SGSN. As indicated above, whether a tunnel endpoint is upper or lower is in relation to the SGW. TEID-Up and TEID-Dn represent the identifiers of the corresponding tunnels. Note that there should not be as many different tunnel endpoint IP addresses as many different TEIDs. However, the tuple IP/TEID can uniquely define a tunnel to a certain direction, and each tunnel can uniquely identify a bearer.

Table 2 is an example mapping table for the proposed network caching architecture. In this table, the information kept in the conventional mapping is also kept. In Table 2, a number of additional records for each pair of uplink and downlink tunnel mappings of a bearer are also kept. The additional records include, among others:

A reachability of the network cache selected for the given bearer, including the network cache's IP address (Cache-IP) and possibly the tunnel identifiers (Cache-TID) for the tunnels to and from the network cache, respectively; and A list of ongoing flows that currently involve the network cache, specified by the source and destination IP addresses (sourceIP, destIP), and source and destination ports (sourcePort, destPort), respectively.

TABLE 2

| S-IP$_1$ | TEID-Up$_{S1}$ TEID-Dn$_{S1}$ | R-IP$_1$ | TEID-Up$_{R1}$ TEID-Dn$_{R1}$ | Cache-IP$_1$ | Cache-TID$_{Up}$ Cache-TID$_{Dn}$ | List of flows {sourceIP$_{1x}$, destP$_{1x}$, sourcePort$_{1x}$, destPort$_{1x}$} |
|---|---|---|---|---|---|---|
| ... | ... | ... | ... | | | ... |

The reachability of network cache, in one aspect, refers to the IP address of the network cache. Note that the packets from the host should be tunneled to the cache. Otherwise, they would follow the route towards the original destination. When tunneled, the packets are encapsulated with another IP header having the network cache IP address as destination. Also to support uplink tunneling during a cache miss, there is also a need to differentiate different bearers within this tunnel to/from the network cache, and TEIDs allow the bearers to be differentiated.

The records of Table 2 may be described as follows. As noted, each IP/TEID tuple can uniquely define a tunnel to a certain direction. Thus, each R-IP/TEID-Up$_R$ tuple uniquely identifies a from-lower tunnel used by the tunnel switch to receive tunnel messages from a corresponding lower endpoint (e.g. RBS, RNC).

Generally, each from-lower tunnel can be identified through a combination of a lower endpoint identifier and a from-lower tunnel identifier. The lower endpoint identifiers, which can be IP addresses, identify the lower endpoints of the from-lower tunnels. Also, the from-lower tunnel identifiers of the different from-lower tunnels allow bearers to be differentiated. Table 2 may include any number of these from-lower tunnels.

Note also that in Table 2, the from-lower tunnel (e.g. identified by the R-IP$_1$/TEID-Up$_{R1}$ tuple) is mapped to a network cache, which is identified by a cache address Cache-IP$_1$, capable of tunneling data to one or more lower endpoints. Table 2 may include any number of such network caches such that each from-lower tunnel is mapped to one of the network caches. This makes possible to redirect a terminal request to the proper network cache simply based on the particular from-lower tunnel used by the tunnel switch to receive the terminal request.

For each network cache, a corresponding to-cache tunnel is identifiable (e.g. through Cache-TID$_{Up}$). The to-cache tunnel can be used by the tunnel switch to send tunnel messages to the network cache, which is the tunnel endpoint of the to-cache tunnel. In Table 2 for example, the tunnel switch can send tunnel messages to the network cache whose address is Cache-IP$_1$ using to-cache tunnel identified by Cache-TID$_{Up}$. Also for each network cache, a list of ongoing flows (e.g. list of source and destination addresses and ports) involving the network cache is also maintained. There can be any number of such on going flows for each network cache.

Generally, Table 2 can include information regarding one or more to-cache tunnels. Each to-cache tunnel is identifiable through a combination of a cache identifier and a to-cache tunnel identifier. Table 2 also includes a list of flows for handling by the network caches, and Table 2 is also arranged such that each of the one or more flows is mapped to one of the to-cache tunnels.

Similar to the tuple identifying the from-lower tunnel, the S-IP$_1$/TEID-Up$_{S1}$ tuple uniquely identifies the to-upper tunnel used by the tunnel switch to send tunnel messages to the corresponding upper endpoint (e.g. PGW). Table 2 may include any number of these to-upper tunnels and upper endpoints.

Note that Table 2 is arranged such that each to-upper tunnel (e.g., S-IP$_1$/TEID-Up$_{S1}$) corresponds to a from-lower tunnel (e.g., R-IP$_1$/TEID-Up$_{R1}$), i.e. each to-upper tunnel can be viewed as being mapped to a corresponding from-lower tunnel. In effect, the corresponding from-lower and to-upper tunnels pair defines an uplink path for communication from the lower endpoint 260 of the from-lower tunnel 283 to the upper endpoint 250 of the to-upper tunnel 287 as seen in FIG. 2.

Just as there are from-lower and to-upper tunnels in the uplink direction, there are also to-lower tunnels (e.g., identifiable through R-IP/TEID-Dn$_R$ tuple) and from-upper tunnels (e.g., identifiable through S-IP/TEID-Dn$_S$ tuple), and each correspondingly mapped pair of from-upper and to-lower tunnels define a downlink path for communication from the upper endpoint 250 of the from-upper tunnel 297 to the lower endpoint 260 of the to-lower tunnel 293 also as seen in FIG. 2.

Note that Table 2 is arranged such that for each from-lower tunnel 283 for receiving tunnel messages from a lower endpoint 260 to the TGW 210, a corresponding to-lower tunnel 293 for sending tunnel messages from the TGW 210 to the same lower endpoint 260 can be identified and vice versa. In other words, the corresponding from-lower and to-lower tunnels form a bidirectional traffic path related to the flow between the TGW and the lower endpoint. Similarly, for each to-upper tunnel 287, a corresponding from-upper tunnel 297 (same upper endpoints) which together form a bidirectional traffic path related to the flow between the TGW and the upper endpoint can be identified and vice versa.

Also, just as each from-lower tunnel 283 is mapped to one of the network caches 240, it can be said that each to-upper tunnel 287, each from-upper tunnel 297, and/or each to-lower tunnel 293 are mapped to one of the network caches 240. Such mapping is useful in performing functions such as a cache fill. For example, when downlink data is received from the PGW on one of the from-upper tunnels, the tunnel switch can redirect the received downlink data to the appropriate network cache.

While not shown in Table 2, note that each pair of entries (IP/TEID) describing the uplink and downlink tunnel relations is also connected in the TGW to an EPS (Enhanced Packet System) bearer identity record that contains information about the terminal and bearer, including also the IMSI (International Mobile Subscriber Identity). The importance of these relationships will be demonstrated when the tunnels belonging to the different terminals and bearers by the TGW during mobility are identified.

Table 2 maybe actively managed by the mapper 235 and the information in the table may be accessible to other entities, such as the tunnel switch 215 and the controller 225, through the mapper 235. Alternatively, Table 2 may be directly accessible to the other entities.

Tunnel Switch

The conventional tunnel switching function in the SGW decapsulates the incoming packets coming from one of the GTP tunnels, and encapsulates and sends the packets to an outgoing tunnel corresponding to the same bearer.

In the proposed network caching architecture, the tunnel switch can perform, in addition to the functions performed by the conventional tunnel switching function, some or all of the following:

Redirect uplink traffic to the network cache;
Redirect uplink traffic to the upper endpoint, e.g., PGW;
Redirect downlink traffic to the network cache; and
Register ongoing flows.

Redirect Uplink Traffic to the Network Cache

To perform this function, the tunnel switch identifies the traffic to be broken out from the initial tunnels, and the identified traffic is sent to the network cache. In the uplink direction, this traffic can include client requests towards an origin server. This function may depend on the application types to be cached. For example, in case of HTTP-caching, a simple port-based classification may be used, such as based on destination port 80 (for uplink traffic) and source port 80 (for downlink traffic). For other applications, e.g., peer-to-peer file sharing, a DPI (Deep Packet Inspection)-based classification may be used. The rules for classification can be preconfigured by the O&M (operation and management).

Once the packets to be redirected are identified, the tunnel switch encapsulates the traffic based on the information contained in the mapping table, e.g., in Table 2. As seen, Table 2 includes a relationship between the GTP tunnel from which the packets are received and the network cache that handles the traffic for that terminal. Based on this information, the tunnel switch encapsulates and sends the packets to the corresponding tunnel.

The network cache, in one aspect, acts as a traffic "shortcut" to the terminal. In this aspect, the network cache does not send the traffic back to the TGW. Rather, the network cache sends data directly to the downlink tunnel endpoint such as the eNodeB, RNC or SGSN. In one example embodiment (see FIG. 4), the shortcut is achieved by including an interface between the TGW and the network cache, through which the tunnel switch informs the network cache when there is a new flow to be directed to the network cache about where to send back the response.

Figure 4:
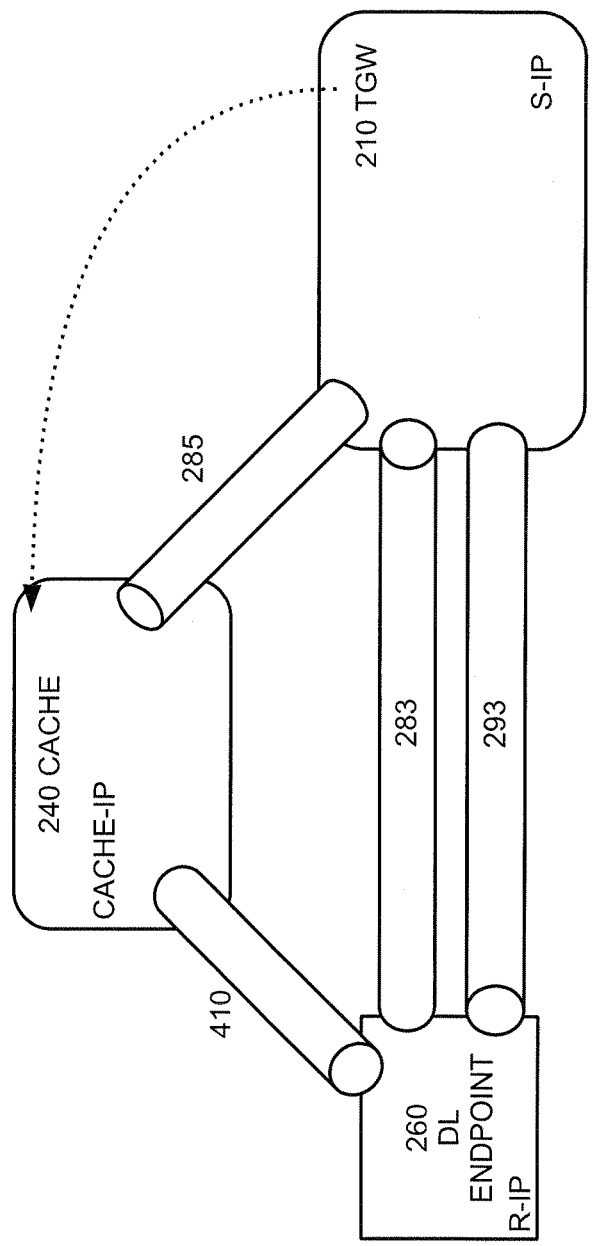
FIG. 4 illustrates an example of a caching architecture.

In FIG. 4, it is assumed that the TGW 210 receives tunnel messages, e.g., packets, from a particular lower endpoint 260 through a particular from-lower tunnel 283. For clarity, the particular lower endpoint is referred to as the DL endpoint 260 and the particular from-lower tunnel is referred to as the FROM-DL tunnel 283.

Once the packets to be redirected are identified, the TGW 210, and in particular the tunnel switch 215 (not shown) encapsulates the traffic based on the information contained in the mapping table, e.g., in Table 2. As seen, Table 2 includes a relationship between the GTP tunnel from which the packets are received and the network cache that handles the traffic for that terminal. Based on this information, the tunnel switch encapsulates and sends the packets to the corresponding to-cache tunnel 285. Again for clarity, the particular to-cache tunnel is referred to as the TO-SELECTED-CACHE tunnel 285.

The tunnel switch 215 decapsulates the client request and tunnels the request, as well as subsequent uplink packets from the client, to the selected network cache using the TO-SELECTED-CACHE tunnel 285. The request and the subsequent uplink packets are encapsulated. The tunnel switch 215 also sends a separate control message (see dashed arrow) with the downlink parameters to the selected network cache 240. Referring back to Table 2, example downlink parameters are the R-IP$_X$ and TEID-Dn$_{RX}$ pair. This informs the selected network cache where and to which bearer to send the traffic belonging to the specific flow, and the selected network cache services the request via the cache-to-lower tunnel 410.

Note that the in the case of 2 G and 3 G accesses (RNC or SGSN as downlink tunnel endpoints) the applicability of the shortcut may depend on the placement of the RNC and SGSN sites relative to the TGW sites. Preferably, the network cache is located closer to the end user than to the TGW. If the RNC/SGSN sites and TGW sites are equally centrally placed, then instead of the traffic shortcut, the most straightforward solution would be the applicability of a co-located network cache, as will further be described later.

Figure 5:
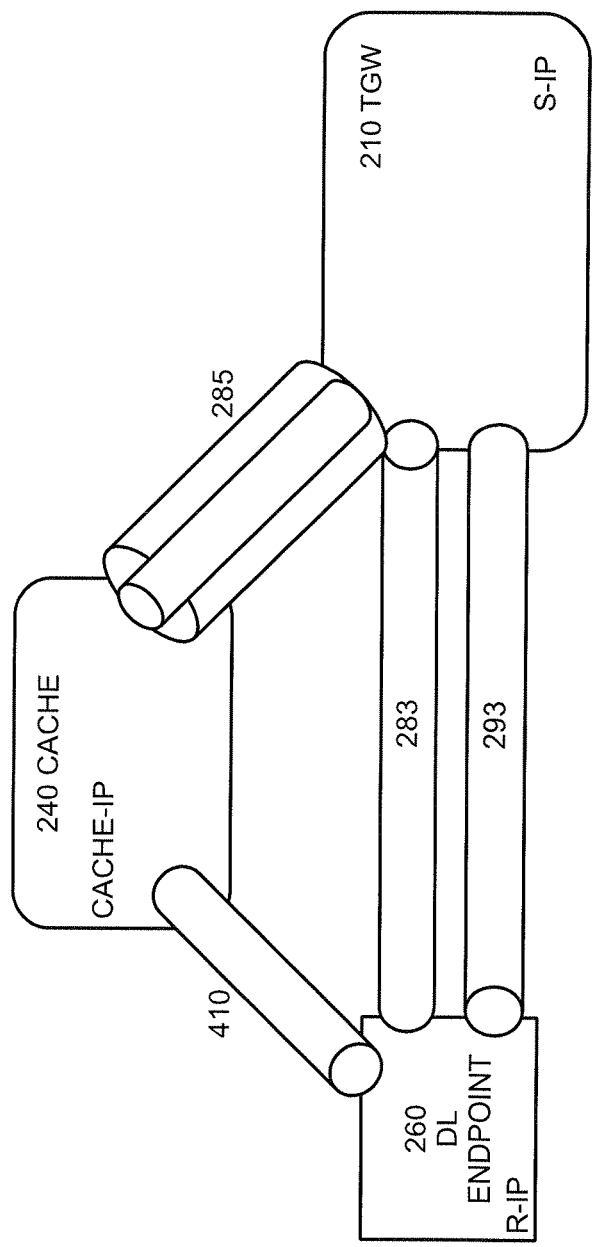
FIG. 5 illustrates another example of an access network caching architecture.

Another example access network caching architecture is illustrated in FIG. 5. Unlike the embodiment in FIG. 4, there is no need for explicit signaling between the tunnel switch 215 and the selected network cache 240 in this architecture. The selected network cache 240 implicitly infers the tunnel identifiers to be used from the information inserted by the tunnel switch 215 in the request packets. This may be achieved by the tunnel switch 215 encapsulating the user requests with the tunnel identifiers to be used in downlink direction. The downlink tunnel parameters are "piggybacked" and tunneled to the network cache 240. The selected network cache 240 then can encapsulate the data traffic to the terminal using the same tunnel identifiers as received from the tunnel switch 215.

This solution assumes that there is uplink data traffic transmitted towards the network cache so that the selected cache is informed in time about potential changes of the downlink tunnel identifiers during, e.g., handovers. This assumption may be valid for TCP-based traffic, and thus such downlink tunnel piggyback solution may be very useful in the TCP-based context. However, this solution may have limited usage for the UDP-based traffic.

As noted above, it is preferred that the network caches be located close to the end user. This necessarily implies that at least some network caches are separate from the TGW as illustrated in FIG. 3. In one aspect, a fallback mechanism is implemented in the TGW to deal with potential network cache failures. In one example solution, the tunnel switch periodically monitors the connected network caches, e.g., through ping and/or keep alive signals. The tunnel switch will not redirect requests to a certain network cache if the monitoring indicates that the network cache is not alive.

Figure 6:
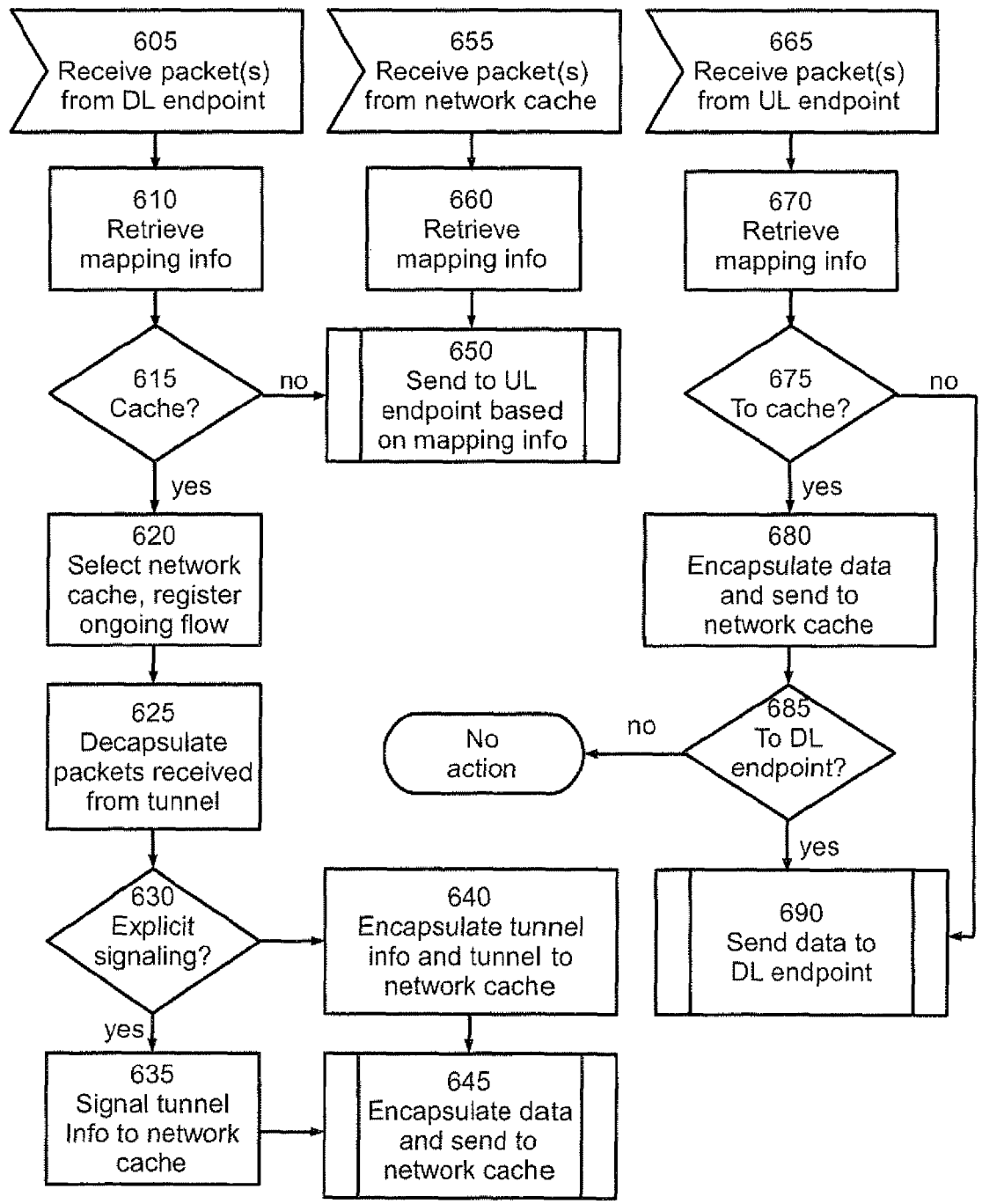
FIG. 6 illustrates a flow chart of an example tunnel switching method.

FIG. 6 illustrates an example flow chart of a tunnel switching method performed by a tunnel switch of a TGW. The example flow chart is comprehensive in a sense that the above-discussed functions of the inventive tunnel switch may perform—redirect uplink traffic to the network cache, redirect uplink traffic to the PGW, redirect downlink media traffic to the network cache, and register ongoing flows—are represented in the flow chart at least to some degree.

In the figure, steps 605-645 relate to the redirect of uplink traffic to the network cache. Redirecting uplink traffic to the network cache is initiated in step 605 when the tunnel switch of the TGW receives a terminal request directed to a data server for a flow of data. The terminal request originates from a terminal and is forwarded to the TGW by a DL endpoint through a FROM-DL tunnel. The FROM-DL tunnel is one of one or more from-lower tunnels for use by the TGW to receive tunnel messages from one or more lower endpoints. As noted above, each from-lower tunnel is identifiable through a combination of a lower endpoint identifier (e.g. R-IP) and a from-lower tunnel identifier (e.g. TEID-Up$_R$). The from-lower tunnel identifiers of different from-lower tunnels allow the bearers to be differentiated.

In step 610, the tunnel switch retrieves the mapping information by either directly accessing the mapping database or through the mapper. As indicated above, Table 2 includes a relationship between the tunnel from which the packet is received and the network cache that handles the traffic for that terminal. In other words, the mapping table is arranged such that each from-lower tunnel 283 can be mapped to one of the network caches 240 (see e.g., FIG. 2). In step 615, the tunnel switch determines whether there is a network cache that corresponds to the FROM-DL tunnel from which the request was received. If the FROM-DL tunnel is one of the from-lower tunnels that is mapped to a network cache, then the method proceeds to step 620 in which the network cache mapped to the FROM-DL tunnel is selected as the selected network cache. Also in step 620, the tunnel switch can register the flow associated with the terminal request in the mapping table, and map the registered flow with the selected network cache. More details regarding the registering and mapping of flows are provided below.

In step 625, the tunnel switch decapsulates the packets received from the FROM-DL tunnel. The received packets can be the request from the terminal and subsequent uplink packets destined for the data server.

Then the tunnel switch provides to the selected network cache the downlink parameters. The downlink parameters include a DL endpoint identifier (e.g., R-IP) and a FROM-DL tunnel identifier (e.g., TEID-Up$_R$) which identify the DL endpoint and a bearer of the flow. Thus, the downlink parameters include the tunnel information of the FROM-DL tunnel.

As indicated above, the downlink parameters can be provided to the selected network cache by either explicitly signaling the parameters or by piggybacking. Thus, in step 630, the tunnel switch determines whether the parameters should be explicitly signaled. If so, the parameters are signaled over a control interface in step 635. If not, the tunnel switch encapsulates the parameters and tunneled to the selected network cache. In particular, the parameters are encapsulated with an IP header using an IP address of the selected network cache and sent through the TO-SELECTED-CACHE tunnel in step 640.

After the downlink parameters are sent, the terminal request decapsulated in step 625 is encapsulated and sent to the selected network cache through the TO-SELECTED-CACHE tunnel in step 645. Note this implies that the TO-SELECTED-CACHE tunnel is selected in conjunction with selecting the network cache. To enable this to occur, the mapping table also includes information on one or more to-cache tunnels for use by the TGW to send tunnel messages to the one or more network caches, with each to-cache tunnel being identifiable through a combination of a cache identifier and a to-cache tunnel identifier, and also includes one or more flows for handling by the selected network cache. The mapping table is arranged such that each of the one or more flows is mapped to one of the to-cache tunnels. In this way, the particular tunnel used to redirect the terminal request to the selected network cache allows the flow to be differentiated from other flows when a cache miss occurs.

With such mapping table, selecting the TO-SELECTED-CACHE tunnel becomes selecting the particular to-cache tunnel mapped to the flow. Then the terminal request decapsulated in step 625 can be encapsulated in step 645 using the cache identifier (e.g. Cache-IP) of the TO-SELECTED-CACHE tunnel which identifies the selected network cache as a destination. Also in step 645, any subsequently received uplink data packets decapsulated in step 625 are likewise encapsulated and sent to the selected network cache through the TO-SELECTED-CACHE tunnel.

While not shown, the tunnel switch can determine whether or not the selected network cache is alive anytime prior to sending the encapsulated terminal request and the downlink tunnel parameters to the selected network cache. If the tunnel switch determines that the selected network cache is not available, then method may proceed to step 650 in which the tunnel switch sends the terminal request to the upper endpoint, e.g. the PGW, so that the request may be served.

Of course, if in step 615 the tunnel switch determines that there is no network cache that corresponds to the FROM-DL tunnel or the selected network cache is otherwise unavailable, then the method may also proceed to step 650.

Redirect Uplink Traffic to the PGW

Once the network cache receives the request from the TGW, it is possible that the cache does not have the requested content, i.e., a cache miss can occur. When a cache miss occurs, the network cache forwards the original request back to the tunnel switch, so that the request can be transmitted to its original destination. This would be needed when the network cache does not have a direct connection to the service network or to the Internet through a public IP address.

In case of cache misses, the subscriber request should be redirected to its initial path, i.e., to the to-upper from the TGW towards the upper endpoint, e.g., PGW, when the network cache is not directly addressable from the external world. The tunnel switch receives such a packet on the from-cache tunnel identified by the Cache-IP/Cache-TID$_{Dn}$ tuple from the network cache. The information about the mapping of the downlink tunnel from the network cache to the corresponding uplink tunnel to the PGW is registered in the mapping table (e.g. Table 2) accessible to the tunnel switch. The tunnel switch selects the proper uplink tunnel for forwarding the request packet based on the information in the mapping table.

Since this type of uplink traffic is received from a tunnel other than the tunnel used for the original uplink packets, this information ensures that the packets received from the network cache will not be redirected again to the network cache.

In FIG. 6, steps 655, 660 and 650 relate to the redirect of uplink traffic to the upper endpoint 250 such as the POW. Redirecting uplink traffic to the upper endpoint is initiated in step 655 when the tunnel switch of the TGW receives packets from the selected network cache. For example, the packets may be a cache miss message from the cache through a FROM-SELECTED-CACHE tunnel that corresponds to the TO-SELECTED-CACHE tunnel. Note these tunnels form a bidirectional path between the TGW and the selected network cache.

When the cache miss packets which can include the original terminal request are received, the tunnel switch retrieves the mapping information in step 660, by either directly accessing the mapping database or through the mapper. Just as the mapping table includes information on one or more to-cache tunnels, the mapping table may also include information on corresponding one or more from-cache tunnels for use by the TGW to receive tunnel messages. Each from-cache tunnel is identifiable through a combination of the cache identifier (e.g., Cache-IP) and a from-cache tunnel identifier (e.g., Cache-TID$_{Dn}$).

The mapping table also includes information regarding one or more to-upper tunnels for use by the TGW to send tunnel messages to one or more upper endpoints, in which each to-upper tunnel is identifiable through a combination of an upper endpoint identifier (e.g., S-IP) and a to-upper tunnel identifier (e.g., TEID-Up$_S$). The mapping table can be arranged such that each from-cache tunnels is mapped to one of the to-upper tunnels. Then in step 660, the to-upper tunnel mapped to the FROM-SELECTED-CACHE tunnel can be selected as a TO-UL tunnel. Then in step 650, the terminal request is forwarded to the upper endpoint.

Referring back to FIG. 2, an example cache miss redirect scenario can be described as follows. The tunnel switch 215 receives the terminal request from the DL endpoint 260 through the FROM-DL tunnel 283 and redirects the request to the selected network cache 240 through the TO-SELECTED-CACHE tunnel 285. The selected network cache 240 then sends the cache miss message to the tunnel switch 215 through the FROM-SELECTED-CACHE tunnel 295. The tunnel switch 215 upon receiving the cache miss message in step 655 retrieves the mapping info in step 660 and selects the TO-UL tunnel 287, and forwards the original terminal request to the UL endpoint 250 through the TO-UL tunnel 287.

Redirect Downlink Traffic to the Network Cache

Also in case of a cache miss, it is preferred that the content that will be received downstream on the regular path is stored in the network cache (cache-fill). That is, there can be instances when some part of the downstream traffic should be diverted also to the network cache. The network cache can store the diverted content so that later requests for such contents can be served. There are alternative procedures to achieve the cache-fill. In a first alternative, the tunnel switch may be pre-configured with redirect rules. An example of a redirect rule can be to redirect all downlink packets with source port 80 (http traffic) to the network cache.

In a second alternative, when the network cache maps the upstream packet back to its original tunnel, the tunnel switch may be implicitly informed about the network cache's interest in the downstream traffic. As an example, it may store the flow's descriptor for which the tunnel switch should redirect the downlink packets. The flow descriptor may be a five-tuple value—source and destination IP addresses, source and destination ports (TCP or UDP), and either a protocol field or a DSCP field. Note that the redirection rule in the lookup procedure is opposite to that used in the lookup for the uplink packets, i.e., the source and destination IP and TCP/UDP fields should be exchanged.

If the tunnel switch receives packets matching such a descriptor, it can divert the packets to the network cache. The tunnel switch can also send identical copies of the packets to the original destination, i.e., to the requesting terminal via the lower endpoint. Optionally, the network cache may forward the diverted packets to the lower endpoint, and thus relieving the burden from the tunnel switch of having to send identical packet copies. Since downlink tunnel information is also needed in the network cache in this instance to identify the proper cache-to-lower tunnel, the tunnel switch can provide the proper identifiers to the network cache, e.g., by encapsulating the user requests with the tunnel identifiers to be used in downlink direction.

In FIG. 6, steps 665-690 relate to the redirect of downlink traffic to the network cache. Redirecting the downlink traffic to the network cache, i.e., cache fill, initiates upon the TGW receiving in step 665 the data traffic packets related to the flow of the original terminal request. Referring to FIG. 2, the downlink traffic is received from the UL endpoint 250 through a FROM-UL tunnel 297. The FROM-UL tunnel is one of the one or more from-upper tunnels 297 used by the TGW 210 to receive tunnel messages from corresponding one or more upper endpoints 250. The mapping table can include information on the one or more from-upper tunnels. Each from-upper tunnel can be identified through a combination of the upper endpoint identifier (e.g., S-IP) and a from-upper tunnel identifier (e.g., TEID-Dn$_S$)

In step 670, the tunnel switch retrieves the mapping information, and in step 675, the tunnel switch determines whether or not the downlink data traffic should be redirected to the network cache, i.e., whether a cache fill should occur. To allow this determination to take place, the mapping table may also include one or more flow descriptors identifying one or more flows. As indicated above, each flow descriptor maybe a five-valued tuple (e.g., source address, source port, destination address, destination port, protocol or DSCP field). Also, the mapping table can be arranged to map each flow descriptor with one of the to-cache tunnels. Then in step 675, the tunnel switch can select the TO-SELECTED-CACHE tunnel that is mapped to the flow received through the FROM-UL.

Then in step 680, the tunnel switch encapsulates the downlink data received from the upper endpoint and redirects the encapsulated data to the selected network cache through the TO-SELECTED-CACHE tunnel.

In step 685, the tunnel switch determines whether or not it should forward the received downlink data should to the DL endpoint. As mentioned above, the selected network cache can relieve the burden of sending the downlink data to the DL endpoint. The network cache can do this automatically or can be instructed by the tunnel switch to do so.

If it is determined that the tunnel switch should also send that data to the DL endpoint, the tunnel switch forwards the redirected data traffic to the DL endpoint in step 690 through a TO-DL tunnel corresponding to the FROM-UL tunnel. To forward the data traffic, the tunnel switch can select from the mapping table the TO-DL tunnel that corresponds to the FROM-UL tunnel. This means that the mapping table should include information regarding one or more to-lower tunnels for use by the TGW to send tunnel messages to the one or more lower endpoints, in which each to-lower tunnel is identifiable through a combination of the lower endpoint identifier (e.g., R-IP) and a to-lower tunnel identifier (TEID-Dn$_R$), and the mapping table should be arranged such that each from-upper tunnel is mapped to one of the to-lower tunnels.

Note that if the tunnel switch determines in step 675 that there is no corresponding network cache or the network cache is otherwise unavailable (e.g., no response to a ping or keep alive signals), the tunnel switch can proceed to step 690 and forward the downlink data to the DL endpoint through the TO-DL tunnel.

Referring back to FIG. 2, an example cache fill scenario can be described as follows. The tunnel switch 215 receives the downlink data related to the flow from the UL endpoint 250 through the FROM-UL tunnel 297 in step 665, and encapsulates and redirects the encapsulated data to the selected network cache 240 through the TO-SELECTED-CACHE tunnel 285 in step 680. If the data is also to be forwarded to the DL endpoint 260, the tunnel switch does so through the TO-DL tunnel 293 in step 690.

Register Ongoing Flows

Preferably, the tunnel switch also has the responsibility of registering in the mapping table (e.g. Table 2) the identifiers of each new flow that has been redirected to the network cache. Accurate flow registration allows the mobility of the terminals to be properly handled. For example, in the case of HTTP-caching, the tunnel switch may register the source and destination IP addresses as well as the source and destination ports when a TCP-syn packet is received in the uplink tunnel (and subsequently redirected to network cache) with the destination port 80.

The tunnel switch may also de-register flows which may be triggered by a specific packet in the flow (e.g. TCP-fin). The tunnel switch may also clear registered flow records based on an inactivity timer (similarly to clearing of NAT states in a NAT gateway). Another way is for the network cache entity to inform the tunnel switch about a termination of an application through a control interface. This is beneficial where it would be difficult to infer the end of the application in the previous ways. Inference can be made by identifying TCP-fin packets by packet classification.

In FIG. 2, the ongoing flows are registered and mapped in step 620. In this step, any new flow redirected to the selected network cache is registered and mapped in the mapping table. The mapping is such that the flow, which can be a five-valued tuple as described above, is mapped to the selected network cache and to the to-cache tunnel.

Controller

The controller preferably participates in the bearer signaling. The role of the controller can be, among others, to update the enhanced mapping table with new entries representing the tunnel mappings for the new bearers during attach or bearer setup procedures. The controller can also update the stored information during handovers. In case of TGW-managed caching, the controller may perform the following functions:
  Select optimal network cache; and
  Handle terminal mobility,
Each is described in further detail as follows.

Select Optimal Network Cache

As indicated previously, the network caches are preferably placed at sites closer to the RBSs than to the TGWs. This implies that there will be a larger number of network caches than TGWs in the network. That is, M>N in FIG. 3. Thus, there can be a number of network caches the controller may choose from for a given bearer. The controller can choose the network cache based on various considerations, including:
  Distance of the network cache from eNodeB/RNC/SGSN:
    Preferably, the controller has knowledge of or has access to information regarding the network cache locations relative to eNodeBs/RNCs/SGSN and may select a network cache closest to the source.
    Another possibility is to infer the relative distance relations implicitly. For example, the IP addressing scheme may be utilized. In one embodiment, the R-IP identifiers of the eNodeB/RNC/SGSN and the network cache IP addresses may be compared. In another embodiment, topology information enclosed in the node's FQDN (Fully Qualified Domain Name) may be relied upon to infer the relative distance relations, similarly to when the TGW/PGW selection is made by the MME.
  Network cache capability—the controller may identify the specific service or APN (Access Point Name) the terminal subscribes to during a terminal attach, and the controller may also possess information about the capabilities of the different network caches. For example, when a terminal is subscribed to higher guaranteed quality when reaching YouTube videos is attached, a network cache configured to serve YouTube videos may be selected.
  Load and/or availability of network caches.
  Caching policy—the controller may be preconfigured with user-specific caching policy information or may dynamically retrieve policy information from the PCRF.
    Example caching rules include whether to cache or not, whether to adapt the content or not, caching charging rules, etc.

The selection of the optimal network cache may be accomplished during the terminal attach or bearer setup procedure, i.e., when a pair of new tunnel mapping records is registered in the mapping table such as Table 2. Moreover, the selection of the network cache may take place after a TGW relocation, for the relocated bearers for the flows activated after the relocation. The reachability information for the selected network cache (including the IP address and potentially tunnel identifiers to/from the network cache) can then also be stored in the corresponding records.

Figure 7:
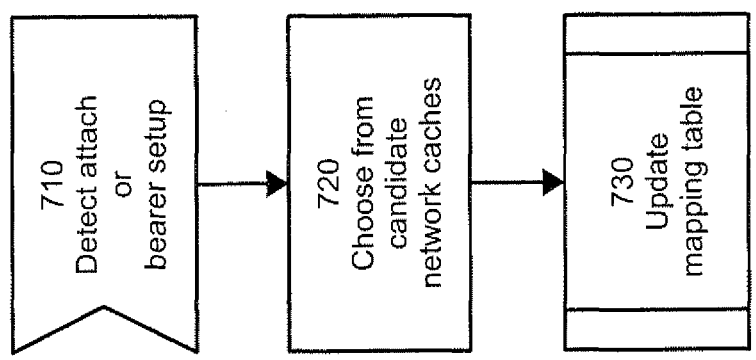
FIG. 7 illustrates a flow chart of an example method of selecting a network cache for a terminal.

FIG. 7 illustrates an example method of selecting a network cache for a terminal. In step 710, the controller detects an attach or a bearer setup process occurring for an attaching terminal. In step 720, the controller chooses or selects a network cache among one or more candidate network caches. The selection can be based on one or more considerations related to one or more tunnels created for tunnel messages between the attaching terminal and the TGW as described above. Then in step 730, the controller updates mapping table to reflect correspondences between the chosen network cache and the one or more tunnels created for tunnel messages between the attaching terminal and the TGW.

Handle Terminal Mobility

When a mobility event such as a handover occurs, the TGW may or may not remain the control node for the bearers. The latter case can occur when the terminal handover induces TGW relocations because the terminal leaves the TGW SA (service area). If the TGW remains the control node for the ongoing flows, i.e., no TGW relocation occurs during the handover, two important problems remain to be handled related to the terminal mobility.

First, if there are active sessions ongoing during the handover, the ongoing flows to the terminal should not be interrupted. This can be achieved via the information registered in the mapping table. Once a given flow involves the network cache (either for serving the request or for cache fill), the flow identifiers are registered in the enhanced mapping table in addition to the uplink and downlink tunnel identifiers for the given bearer and the selected network cache.

Figure 8:
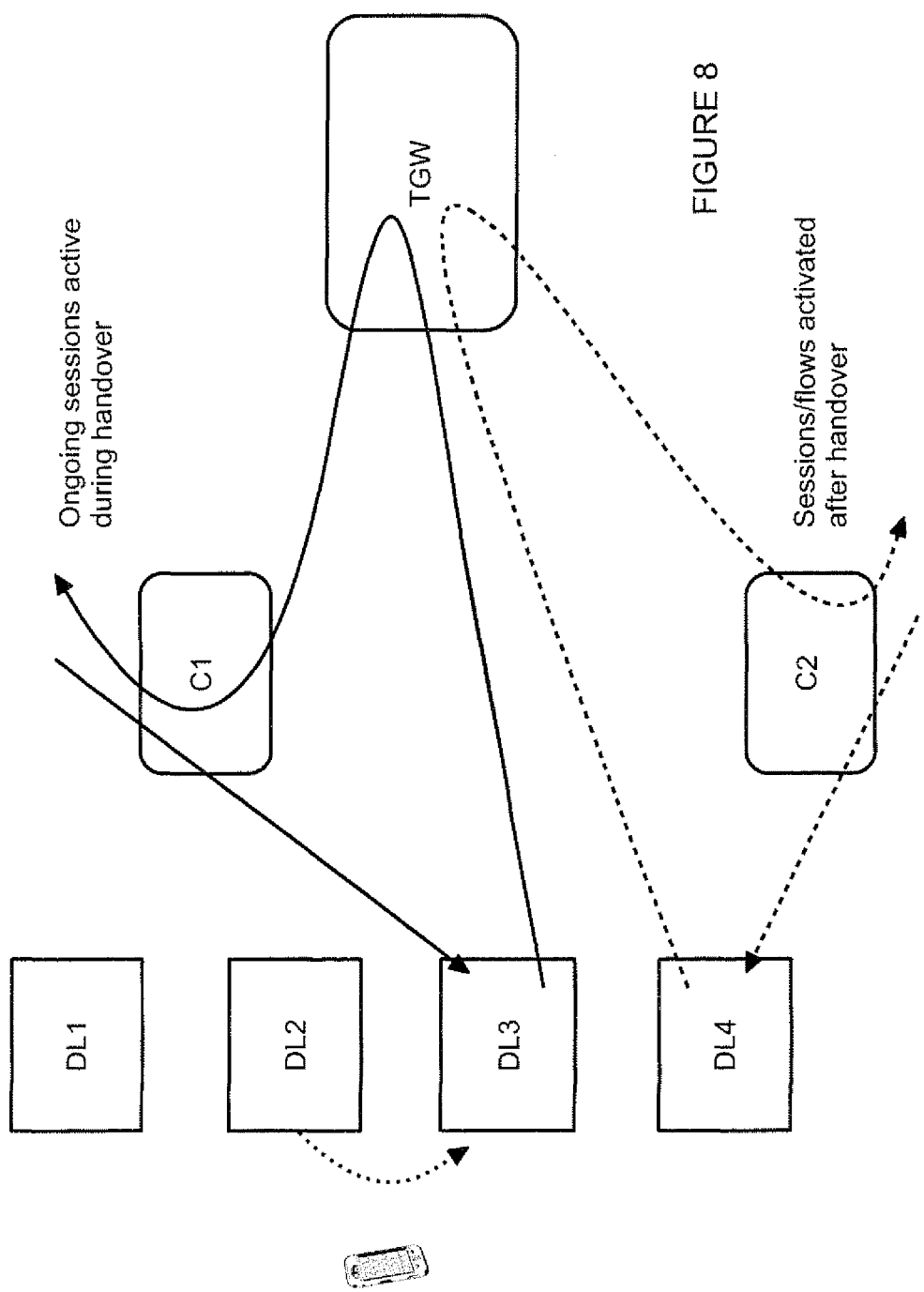
FIG. 8 illustrates an example scenario for handling terminal mobility.

During the handover, the bearer tunnel identifiers are updated by the controller. Since the network cache reachability information does not change, the tunnel switch can redirect the uplink packets for this flow to the same network cache as before as illustrated in FIG. 8. In this figure, it is assumed that the handover for the UE is from a lower endpoint DL2 (e.g., RBS, eNodeB, RNC, etc.) to a lower endpoint DL3 as indicated by the finely dashed arrow. The TGW, and in particular the tunnel switch (not shown in the figure), redirects the uplink packets to the same network cache C1 during the handover as indicated by the solid arrow from the TGW to the cache C1.

However, since the bearer tunnel identifiers have been updated, from this point the tunnel switch should redirect the uplink packets of this flow to the network cache using the new tunnel identifiers for internal encapsulation. As a consequence, the network cache infers that the traffic has to be encapsulated differently, and therefore it will be sent to the new endpoint DL3 (e.g. new RBS, eNodeB, RNC, SGSN, etc.) As seen in FIG. 8, the original network cache switches sending the traffic from the old endpoint DL2 to sending the traffic to the new endpoint DL3 as indicated by the solid arrow from the cache C1 to DL3.

Second, there is a chance that sessions/flows newly established after the handover can be served more efficiently by a network cache different from the one before the handover. This may be achieved in the following way. During the handover, the TGW, and in particular the controller (not shown in FIG. 8), may check whether or not there is a more optimal network cache considering the new location of the terminal. If a more optimal network cache is found such as cache C2, the controller can register the uplink and downlink tunnel parameters once again in the mapping table, using this time the reachability for the more optimal network cache.

Further, the controller may also set a flag for the old record to indicate that the information in that record has to be used only for the ongoing flows, but the tunnel switch should not register any newly established sessions to that record, but instead register to a new record. This will result in a new, optimized path for the newly established sessions as shown by the dashed arrows in FIG. 8 involving the TGW, the network cache C2 and endpoint DL4.

Note that since the TGW is the common node for the 2G, 3G and LTE access, it preserves the bearer knowledge also when the UE handovers between 2G/3G and LTE, I-RAT handovers can be handled in the same way as pure LTE handovers.

Figure 9:
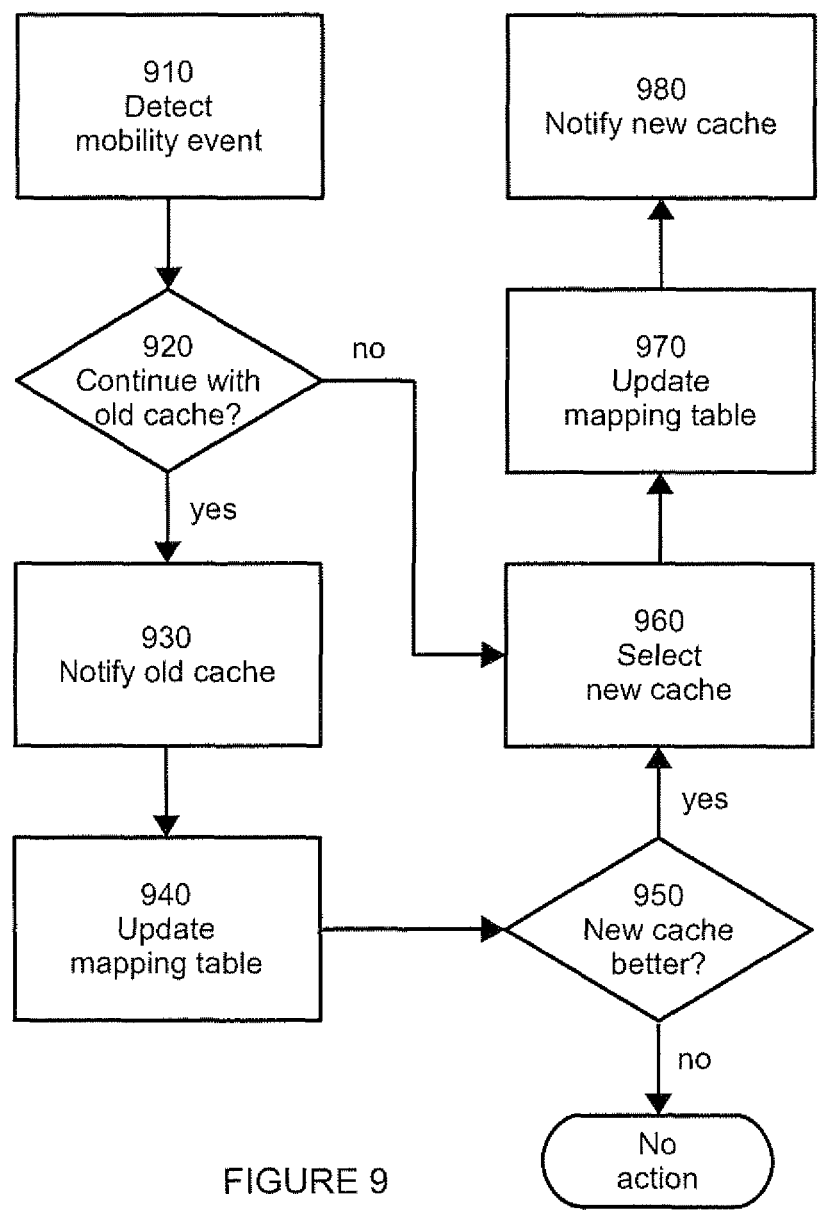
FIG. 9 illustrates a flow chart of an example method of handling mobility.

FIG. 9 illustrates an example method of handling mobility. In step 910, the controller detects an occurrence of a mobility event of a terminal. A mobility event occurs when the terminal's network access is switched from an old lower endpoint to a new lower endpoint, e.g. a handover from old eNodeB to a new eNodeB as the terminal moves from one coverage area to another. Recall that the lower endpoints are located below the TGW in the data path. The data traffic for the terminal is assumed to be handled by an old network cache prior to the mobility event occurring.

In step 920, the controller determines whether the old network cache should continue handling the data traffic for the terminal based on the mobility event. In this step, if there is an ongoing active session for the moving terminal, the controller determines that the old network cache should continue handling the data traffic for the terminal, at least for the duration of the ongoing session.

If the old network cache is to continue handling the traffic, the controller in step 930 notifies—through the tunnel switch—old network cache of the change from the old lower endpoint to the new lower endpoint. For example, the tunnel switch can encapsulate the uplink packets related to the flow of the terminal based on the from-tunnel identifier of the new from-tunnel, and send the encapsulated uplink packets to the old network cache through the to-cache tunnel used by the TGW to send tunnel messages to the old network cache. The encapsulation is performed using the IP address of the old network cache as the destination of the encapsulated data.

The controller in step 940 updates the mapping table to reflect the mapping of the new from-lower tunnel. The lower endpoint identifier of the new from-lower tunnel identifies the new lower endpoint. Also the from-lower tunnel identifier of the new from-lower tunnel corresponds to a new bearer established for the terminal.

As indicated above, while there is an ongoing active session, the network cache should not change for a terminal, However, after the session completes, it is preferred to switch to a more optimal network cache if there is one. The controller can determine whether or not a new network cache is more optimal relative to the old network cache to handle traffic for the terminal based on a new location of the moving terminal in step 950.

If it is determined that there is more optimal network cache, the controller selects the new network cache in step 960, updates the mapping table in step 970, and notifies the new network cache in step 980. In step 980, the controller provides new downlink parameters to the new network cache, The new parameters can include the lower endpoint identifier (e.g. R-IP) and the from-lower tunnel identifier (e.g., TEID-Up$_R$) of the new from-terminal tunnel.

Note that the updating the mapping table in this instance is slightly different from updating the mapping table in step 940 when the network cache does not change. Thus, in step 970, the controller updates the mapping table to reflect a mapping of a new from-lower tunnel to the terminal, the lower endpoint identifier of the new from-lower tunnel identifying the new lower endpoint, the from-lower tunnel identifier of the new from-lower tunnel corresponding to a new bearer established for the terminal. The controller also updates the mapping table to map the new from-lower tunnel to the new network cache. Further, the controller marks the mapping table such that all data traffic of flows related to the terminal existing prior to the mobility event are handled by the old network cache and data traffic of flows related to the terminal created subsequent to the mobility event are handled by the new network cache.

As illustrated in FIG. 9, when it is determined that the old network cache should not continue handling the data traffic for the terminal in step 920, the method can proceed to step 960.

The method illustrated in FIG. 9 relates to handling mobility events that do not involve TGW relocations. As seen in FIG. 8, the lower endpoints and the network caches may change, but the TGW does not.

But mobility events do result in relocations of TGWs. Handovers with TGW relocations would in general be difficult to handle when there is a local network cache involved in the communication. Relocation of ongoing flows would require transfer of all TCP states including socket states (Ack cntrs, tx win, etc.), other protocol states and object identifiers including current position and so on.

However, there are simpler alternatives to handle TGW relocation cases, which guarantee that the same network cache is used for all flows started at the previous location. One possibility is that the network caches near the SA borders are controlled by both TGWs in the different SAs. In this case, it is sufficient to transfer the flow identifiers belonging to the relocated bearer(s) between the TGWs at handover and the new TGW notifies the network cache about the new bearer as in the case of a handover with no TGW relocation.

Figure 10:
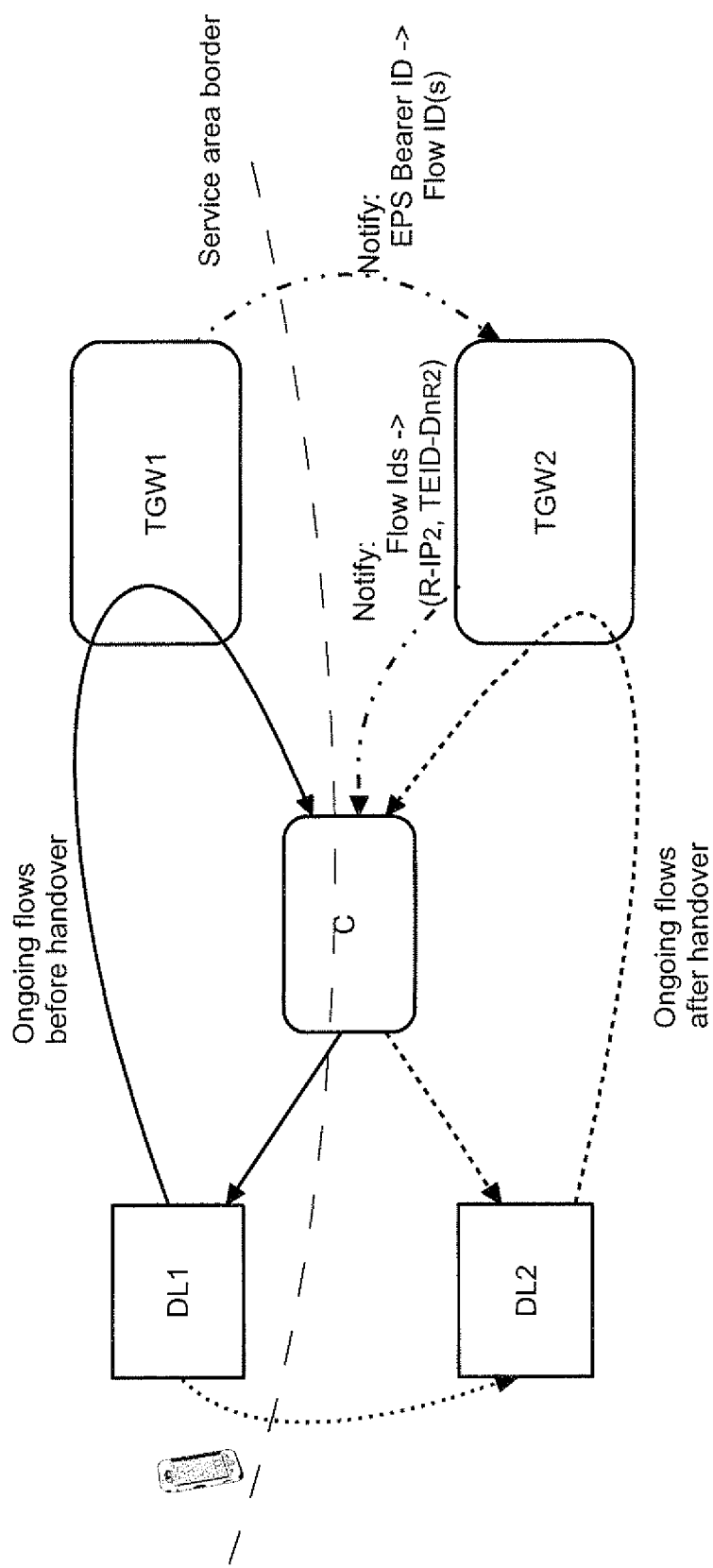
FIG. 10 illustrates an example scenario for handling terminal mobility with TGW relocation without network cache change.

An example representation of this method is illustrated in FIG. 10. In the figure, the network cache C is assumed to be near or at the border of the service areas (SA) serviced by TGW1 and TGW2 (first and second TGWs), and can be controlled by both TGWs. Prior to a handover between a first lower endpoint DL1 (RBS, RNC, eNodeB, etc.) within TGW1 SA and a second lower endpoint DL2 (RBS, RNC, eNodeB, etc.) within TGW2 SA, there are ongoing flows in which packets for the UE are tunneled from the network cache C to DL1.

When the handover takes place, the UE will be in communication with DL2, and thus, the packets should be provided to DL2. Through an interface between the two TGWs, the controller of TGW1 notifies the controller of TGW2 of the flow identifier belonging to the relocated bearer. In TGW2, the controller in conjunction with the tunnel switch updates the mapping table as necessary and notifies the network cache C. The network cache C in response tunnels the packets corresponding to the flow to DL2.

Figure 11:
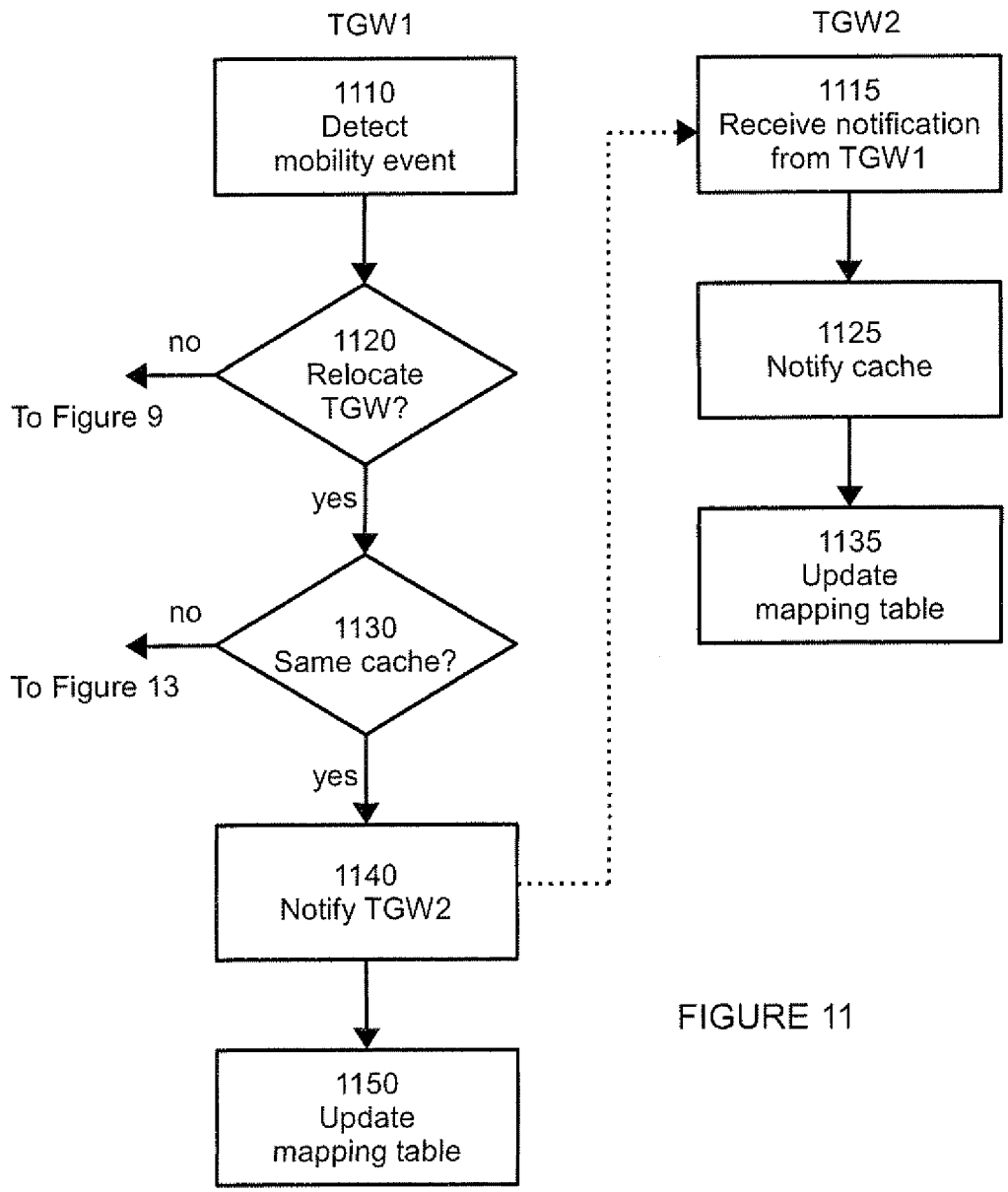
FIG. 11 illustrates a flow chart of an example method of handling mobility with TGW relocation without network cache change.

FIG. 11 illustrates an example method of handling mobility with TGW relocation. In step 1110, TGW1 and in particular the controller of TGW1 (referred to as the first controller)

detects an occurrence of a mobility event of a terminal. In step 1120, the first controller determines whether the mobility event involves TGW relocation. For example, the terminal may be moving out of the service area of TGW1.

If TGW relocation is involved, the first controller in step 1130 determines whether or not the same network cache will continue to handle the data traffic for the terminal. If so, the first controller notifies TGW2 in step 1140. In this step, the first controller provides the flow identifier belonging to the relocated bearer, which may include the lower endpoint identifier of DL2 (e.g., R-IP$_2$) and the new to-lower tunnel identifier (e.g., TEID-Dn$_{R2}$). In step 1150, the first controller updates its own mapping table as appropriate.

The second controller (controller of TGW2) receives the notification from the first controller in step 1115. In response, the second controller notifies the network cache in step 1125 and updates its own mapping table as necessary in step 1135.

Note that if it is determined that the mobility event does not involve TGW relocation in step 1120, this indicates that the situation depicted in FIG. 9 is more applicable. Also, as will be seen, if it is determined that the mobility event involves both TGW relocation and a change in the network cache in steps 1120 and 1130, then the situation depicted in FIG. 13 may be more applicable which will be described in detail below.

The method illustrated in FIG. 11 implies some specific design actions are preferred to be implemented. For example, it can be ensured that each lower endpoint such as an eNodeB belongs to at most two SAs. This can help to avoid ambiguity of neighbour TGW selection. These TGW neighbours to certain eNobeBs may be preconfigured in the TGWs. Also, the individual SA sizes may be set according to the observed subscriber mobility information in order to avoid or minimize circumstances in which a mobile subscriber would cross more than one SA border while downloading the same content. In addition, the network cache may include bookkeeping capabilities to maintain accurate information on which flow is controlled by which TGW. More precisely, the network cache may include capabilities maintain information on which bearer is controlled by which TGW at a particular time. Note that some temporal suboptimal routes may appear for long lasting flows and excessively mobile subscribers.

Another, even simpler alternative to support TGW relocation during mobility (and thus more preferred) is based on a functionality in the MME that guarantees that the TGW is not reallocated at least as long as this would represent a problem for caching. This can be achieved by network configuration (e.g. by assigning a broad service area to an TGW that controls caching) and providing the control node (e.g. MME) with capabilities to ensure that such TGW nodes are re-located for specific subscribers in an optimized way, taking into account when such reallocation does not affect ongoing flows, e.g., during idle terminal mode.

Figure 12:
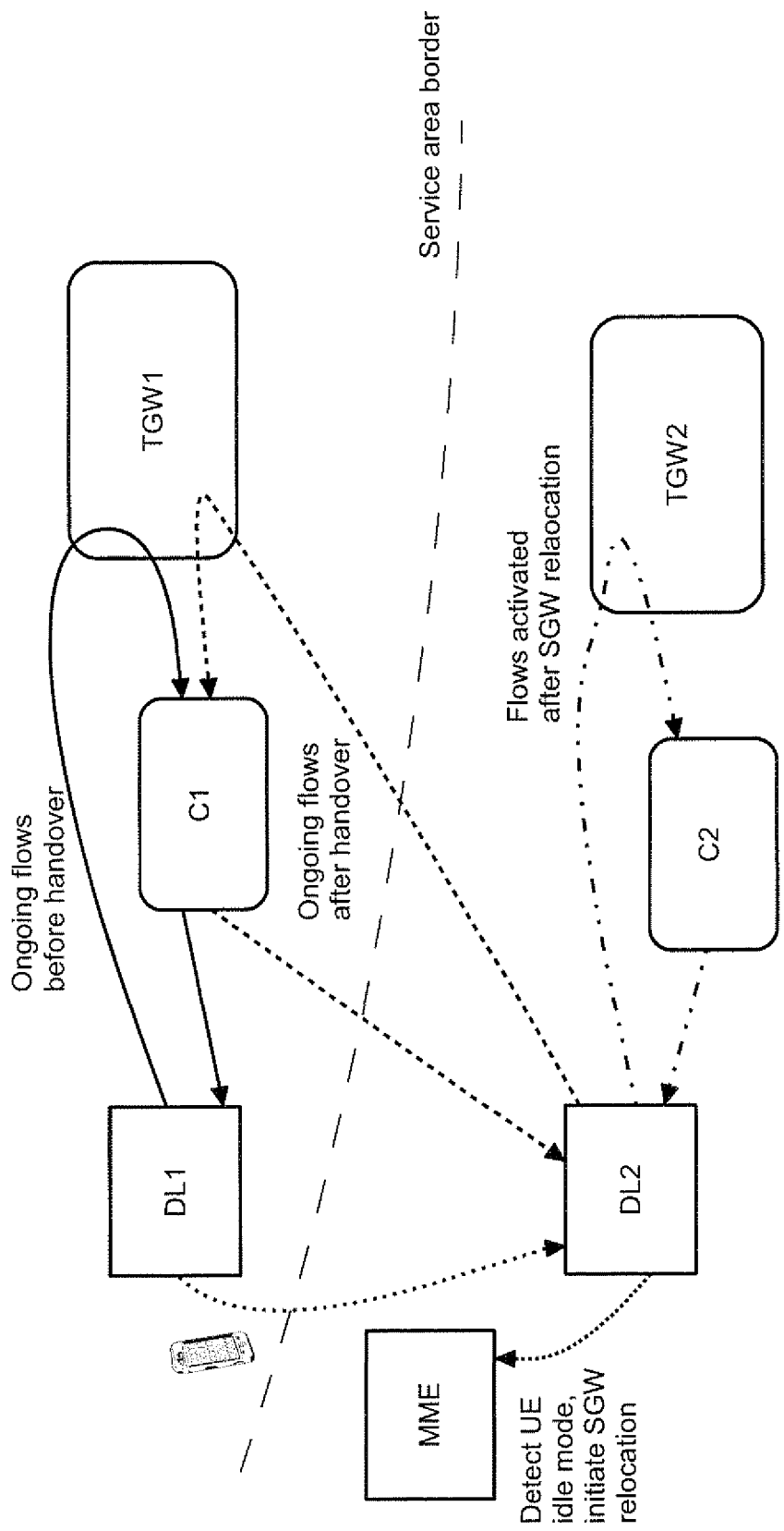
FIG. 12 illustrates an example scenario for handling terminal mobility with TGW relocation with network cache change.

An example representation of this method is illustrated in FIG. 12. In the figure, the first network cache C1 is assumed to be within the SA of the first TGW1 and is controlled by TGW1. Prior to the handover, there are ongoing flows in which packets for the UE are tunneled from C1 to the first lower endpoint DL1.

When the handover takes place, the UE will be in communication with the second lower endpoint DL2, and thus, the packets should be provided to the second DL2. But in this instance, the first TGW1 is still involved in the flow as long as the flow is ongoing. The TGW1 controller updates its mapping table as necessary so that the first network cache C1 tunnels the packets of the ongoing flow to the second lower endpoint DL2 until the flow ends. Note this part is very similar to the intra-TGW handover instance described above with respect to FIGS. 8 and 9.

Afterwards, when the MME detects that the UE is in idle mode, it can initiate an TGW relocation such that flows activated subsequently involve the second TGW2 and the second network cache C2 which is controlled by the second TGW2. Note that each cache C1 and C2 are each controlled by a single TGW.

Figure 13:
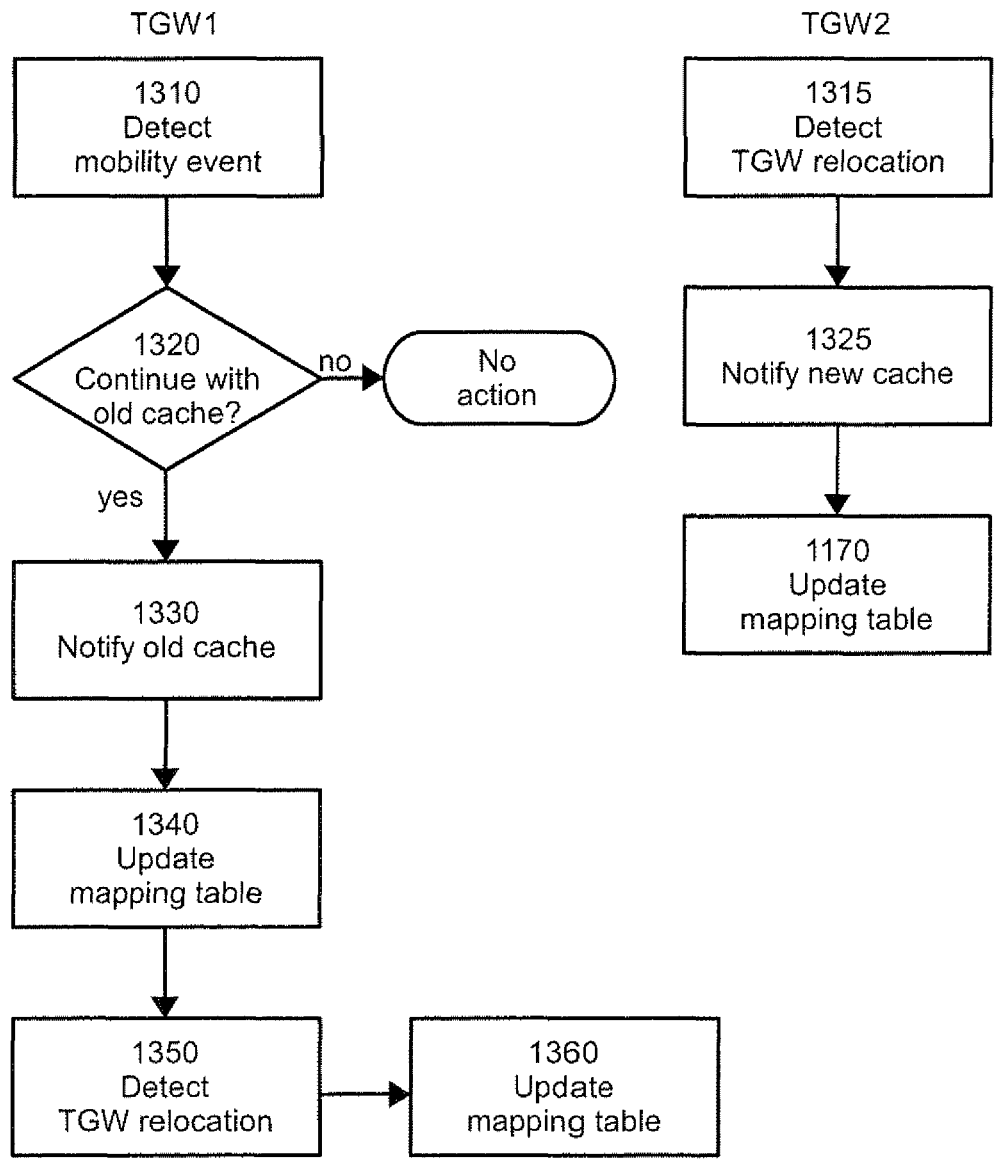
FIG. 13 illustrates a flow chart of an example method of handling mobility with TGW relocation with network cache change.

FIG. 13 illustrates an example method of this alternate way of handling mobility with TGW relocation, Steps 1310, 1320, 1330 and 1340 performed by the first controller of TGW1 are similar to steps 910, 920, 930 and 940 of FIG. 9, and thus will not be described in detail.

The first controller in step 1350 may detect that the TGW relocation for the terminal has been initiated. For example, the first controller may receive a message from the MME. In response, the first controller can update its own mapping table as appropriate in step 1360.

The second controller in step 1315 may likewise detect the initiation of the TGW relocation for the terminal. In response, the second controller can notify the new network cache in step 1325 and updates its own mapping table as necessary in step 1335.

Network Cache

Certain enhanced or additional functionalities in the network cache are desirable compared to an ordinary transparent cache. Note that a transparent cache is assumed to possess a classification function for request recognition, content service function for a cache hit, and transparent request forwarding for cache miss and processing the reply. These additional functionalities may be included in a traffic interceptor of the network cache as illustrated in FIG. 2.

As previously discussed, the downlink data traffic from the network cache in case of cache hit should be a shortcut to the terminal. That is, the data traffic should not have to go back to the TGW which could result in a traffic "tromboning" effect if the TGW resides far apart in the core. One way to achieve this is to provide an interface between the TGW and the network cache on which the tunnel switch can inform the network cache every time there is a new flow to be directed to the network cache about where to send back the response.

In the embodiment illustrated FIG. 5, there is no need for explicit signaling between the tunnel switch and the network cache. In this scenario which is applicable for most TCP-based applications where there is continuous uplink flow of Ack packets, the network cache can infer the tunnel identifiers to be used implicitly from the information inserted by the tunnel switch in the uplink packets.

The control interface between the network cache and the tunnel switch may also be used by the network cache to give a direct feedback to the tunnel switch when a given application terminates and the corresponding flow should thus be removed from the mapping table. The network cache may also be arranged to send additional information. For example, the network cache may send information including service type and volume of traffic sent for charging purposes.

In case of cache miss, assuming that the network cache is not directly reachable from the external network (e.g., it does not have a unique public IP address to the Internet) from where it could directly download the content, the subscriber request is preferably redirected from the network cache to its initial path, i.e., to the uplink (to-upper) tunnel from the TGW towards the PGW. For this, the network cache may send the request using a downlink tunnel (e.g., identified by Cache-IP/Cache-TID$_{Dn}$) towards the TGW. The mapping table includes the information about the mapping of this tunnel to the uplink tunnel, thus the tunnel switch would know which uplink tunnel it has to forward the request packet.

In case of downlink media traffic redirected to the network cache for cache fill purposes, the network cache keeps a local copy, but may also send the packets to the tunnel towards the terminal. This may be done in a similar way as when sending the media traffic directly from the network cache (cache hit), e.g., using the tunnel identifiers that has been previously added to the packet by the tunnel switching function. Of course, the alternative is that the tunnel switch duplicates and sends the packets in both the tunnel to the terminal and the tunnel to the cache.

Note that in case of a cache miss, even if the network cache has a direct connection to the external network (e.g. public IP address in the Internet), it is up to the operator's preferences to decide which request should be fetched directly from the network, and which request should be redirected back to the original uplink tunnel. For instance, some Internet traffic may be charged differently based on the content source (e.g. some Internet content/service providers may be cheaper or more expensive). This may be controlled, by e.g., a pre-configured access control list in the network cache (traffic intercept).

One or more of the concepts described above may also be applied with little modification in pure 2G/3G networks. One difference is that instead of the TGW, the cache control is performed by the SGSN (both 2G and 3G) or RNC (3G only, direct tunnel case). Note that the SGSN and RNC also possess all the knowledge needed, e.g., downlink tunnel mappings for the different PDP contexts, which is updated during each handover.

But in 2G/3G networks, the GTP tunnels terminate at the RNC, thus the traffic always flows through the RNC. From a route optimization perspective, it does not make sense to place a network cache at a site below the RNC—the traffic would have to be tunneled back to the RNC regardless. Thus, a co-located network cache with the RNC would be one (of several) attractive solution. Of course, if the RNCs are placed at core sites, this may limit the gain.

Another characteristic of 2G/3G networks is that certain types of handovers (e.g., SRNS relocation) may not be handled in way as similar to the way proposed here EPC since the node entity controlling the network cache changes. To handle these cases, functions for conveying tunnel information between the old and new control entity can be provided.

Just as network caches can be co-located with RBSs and RNCs, a network cache may also be co-located with a TGW. For example, the network cache may be a part of the TGW functionality (same box), or the network cache is co-sited with the TGW. Such a scenario may be used for RAN caching and for off-loading when it may be assumed that the TGW product is commercially feasible to be manufactured in small boxes, i.e., distribution of the TGW functionality in the RAN becomes feasible.

Such co-located network cache scenario represents a further simplification of the proposed architecture for the following reasons. First, no specific cache functionality is required for the proposed architecture to work. The network cache would send the traffic back to the TGW regardless of the reason and destination of the traffic, so there is no need for destination specific encapsulation in the network cache. As a consequence, an off-the shelf cache product may be used for this solution.

Second, the mapping table can be simplified. Indeed, the network cache identifiers (IP address, tunnel IDs) are not necessary in the mapping table since there is a one-to-one mapping between the TGW and the network cache. The selection of the optimal TGW/network cache to use as well as the guaranteeing the continuity of the ongoing flows for users crossing TGW service areas will be achieved by the optimized TGW relocation function in the MME.

Third, since neither handling terminal mobility requires any specific function, nor optimized cache selection based on topology information is needed, the standard TGW controller does not need any enhancements.

Fourth, the tunnel switch is also simplified because the logic to redirect different (uplink and downlink) flows becomes simpler, since the tunnels to the network cache need not be searched for. Also, no additional encapsulation to implement the shortcut of the traffic is needed.

Indeed, the only significant addition needed in the standard TGW product may be to have a classification of the traffic to be redirected to the network cache and enhancement of the tunnel switch to register the IP/Port identifiers for the ongoing flows involving the network cache in the existing TEID mapping tables and to redirect traffic accordingly in order to support seamless handovers for these flows.

Note that given the above simplifications, even if the TGW remains in the core sites as they are conventionally, one attractive way of gradually introducing caching in the access network is to first enable network caches co-located with the TGW and then further introduce the functionality needed to support non co-located network caches as well.

Figure 14:
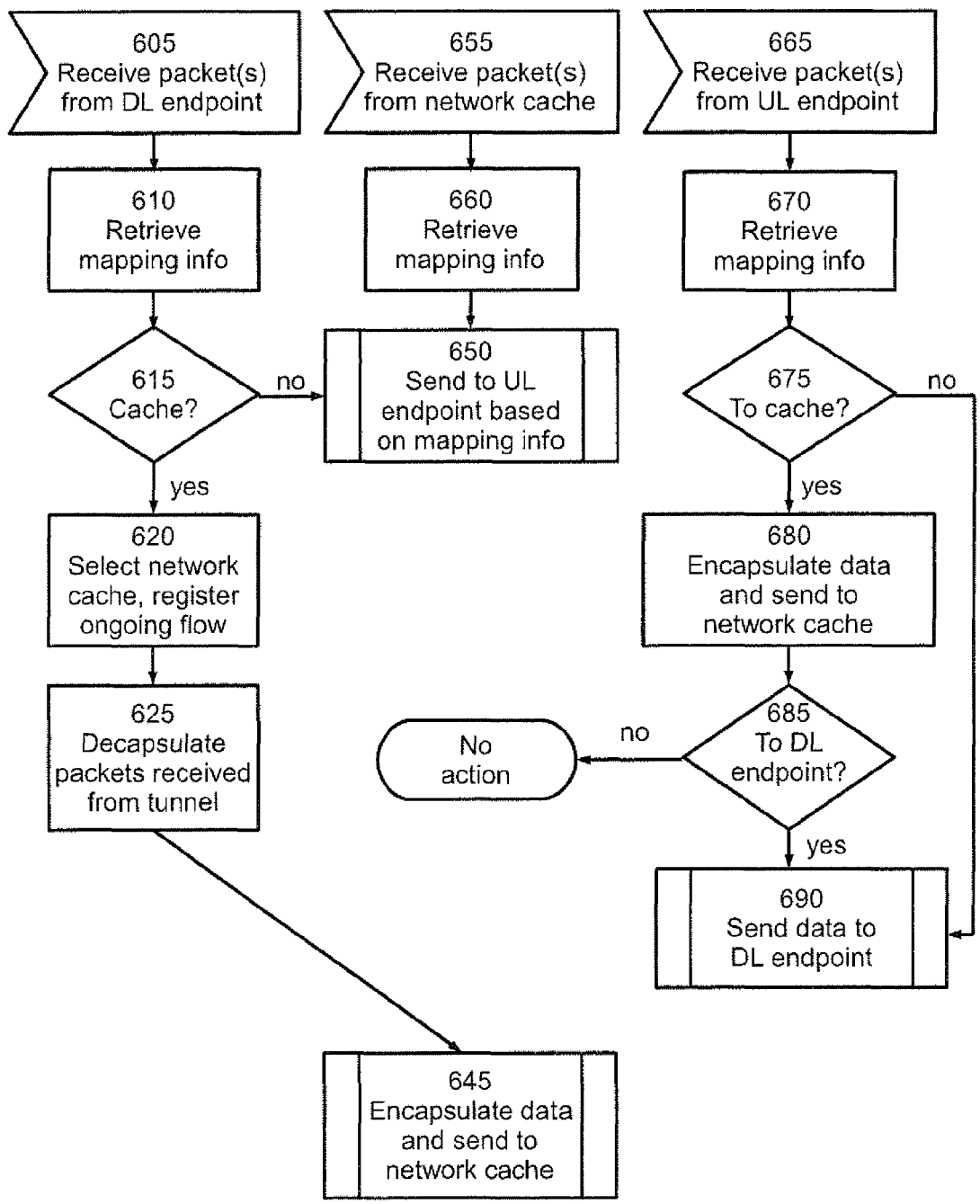
FIG. 14 illustrates a flow chart of another example method of selecting a network cache for a terminal.

FIG. 14 illustrates an example flow chart of tunnel switching method with co-located TGW and network cache. Compared to FIG. 6, the tunnel switching is simplified.

While the present disclosure has focused on network caching as an application, it should be noted that "network cache" can be replaced with "Local Service Network". That is, the disclosed subject matter is capable to break out traffic at the TGW to a local service network similarly to how it would break out the traffic to a network cache.

The local service network may host any kind of application server the user intends to communicate with. Such a breakout is beneficial, if it is economically infeasible to send traffic up to the PGW, and then send the traffic to the service network from there.

One main advantage (of many) is the lightweight nature of the proposed network caching solution that may be applied in access networks below the IP point of presence. The TGW is on-path for all types of data traffic so no specific methods are needed to ensure that all traffic of interest is received by the TGW. The TGW participates in the bearer signaling, so it knows the tunnel identifiers for a given bearer that are needed for re-inserting the traffic from the network cache back to the corresponding tunnels. The TGW already includes capabilities for encapsulation/decapsulation and switching between the tunnels, thus this (compulsory) feature for each caching solution is already implemented in the TGW and needs little modification to switch also to/from network caches.

Also, the TGW has native support for mobility, at least for handovers within the range of the TGW. The only addition needed to support seamless handovers for these flows is to register the IP/Port identifiers for the ongoing flows in the existing TEID mapping tables.

Other advantages of the proposed architecture (among several) are:
  There is little to no impact on the cache functionality. The network cache in the TGW solution may be applied with off-the shelf network cache products since it does not require any specific cache functionality.
  A generic solution is provided for handling different types of mobility, including I-RAT (inter radio access technology) handovers.

It is possible to page an idle terminal, thus network caching may also be used effectively to serve terminals to subscribed services. This makes possible additional optimization (time of day, position of the terminal, etc.)

There is little to no security issues of placing a core network node to the insecure access. Security may be handled by setting up encrypted IP tunnels between the network caches and the TGW.

Charging may also be supported by the TGW. For example, the TGW may send records to the charging system with the volume of traffic served from the network cache to the individual subscribers that makes it possible to apply special charging and ultimately special service offers encouraging subscribers use the network caches and offloading the operator network.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments which may become obvious to those skilled in the art, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method to implement network caching in an access network, the method comprising:

receiving, at a tunnel gateway (TGW), a terminal request directed to a data server for a flow, the terminal request originating from a requesting terminal and forwarded to the TGW by a downlink (DL) endpoint through a FROM-DL tunnel, the DL endpoint being an endpoint of the FROM-DL tunnel;

selecting, at the TGW, based on the FROM-DL tunnel, a network cache to handle the flow; and redirecting, at the TGW, the terminal request to the selected network cache through a TO-SELECTED-CACHE tunnel, the selected network cache being an endpoint of the TO-SELECTED-CACHE tunnel, wherein a mapping table associated with the TGW includes information regarding one or more from-lower tunnels for use by the TGW to receive tunnel messages from one or more lower endpoints located below the TGW, each from-lower tunnel being identifiable through a combination of a lower endpoint identifier and a from-lower tunnel identifier, and the from-lower tunnel identifier allowing a bearer of a flow associated with that from-lower tunnel to be differentiated from a bearer of a flow associated with another from-lower tunnel, one or more network caches capable of providing data to the one or more lower end points, one or more to-cache tunnels for use by the TGW to send tunnel messages to the one or more network caches, each to-cache tunnel being identifiable through a combination of a cache identifier and a to-cache tunnel identifier, and one or more flows for handling by the one or more network caches, wherein for each lower endpoint, there is a corresponding data path between that lower endpoint and an IP point of presence, that lower end point being located below the IP point of presence in that data path, and the TGW being located in between that lower endpoint and the IP point of presence in that data path, wherein the mapping table is arranged such that each from-lower tunnel is mapped to one of the one or more network caches, and such that each of the one or more flows is mapped to one of the one or more to-cache tunnels, wherein the FROM-DL tunnel is one of the one or more from-lower tunnels whose lower endpoint identifier identifies the DL endpoint and whose from-lower tunnel identifier is associated with a bearer of the flow related to the terminal request, wherein the TO-SELECTED-CACHE tunnel is one of the one or more to-cache tunnels whose cache identifier identifies the selected network cache and whose to-cache tunnel identifier is associated with the bearer of the flow related to the terminal request, and wherein the tunnel switch is arranged to select a network cache mapped to the FROM-DL tunnel in the mapping table as the selected network cache.

2. The method of claim 1, further comprising redirecting, at the TGW, uplink packets belonging to the flow related to the terminal request to the selected network cache through the TO-SELECTED-CACHE tunnel.

3. The method of claim 1, further comprising:

registering, at the TGW, the flow related to the terminal request in the mapping table; and mapping, at the TGW, the flow related to the terminal request to the selected network cache in the mapping table, wherein the registration includes a source, a destination, and a protocol of the flow related to the terminal request.

4. The method of claim 1, further comprising:

detecting, at the TGW, an attach or a bearer setup process occurring for an attaching terminal;

choosing, at the TGW, a network cache among the one or more network caches based on one or more considerations related to one or more tunnels created for tunnel messages between the attaching terminal and the TGW; and updating, at the TGW, the mapping table to reflect correspondences between the chosen network cache and the one or more tunnels created for tunnel messages between the attaching terminal and the TGW.

5. The method of claim 4, wherein the considerations include any one or more of:

metrics related to routing of traffic between the candidate network caches and a lower endpoint below the TGW providing network access to the attaching terminal, capabilities of the candidate network caches in relation to a subscription type of the attaching terminal, caching policy to be applied for the given subscriber or service, load on the candidate network caches, and availability of the candidate network caches.

6. The method of claim 1, wherein the step of redirecting the terminal request to the selected network cache comprises:

providing, at the TGW, downlink parameters to the selected network cache;

decapsulating, at the TGW, the terminal request received through the FROM-DL tunnel;

encapsulating, at the TGW, the decapsulated terminal request based on the selected network cache; and sending, at the TGW, the encapsulated terminal request to the selected network cache through the TO-SELECTED-CACHE tunnel, wherein the downlink parameters include the lower endpoint identifier of the FROM-DL tunnel and the from-lower tunnel identifier of the FROM-DL tunnel, which identify the DL endpoint and the bearer of the flow related to the terminal request.

7. The method of claim 6, wherein in the step of providing the downlink parameters to the selected network cache, the downlink parameters are
   signaled to the selected network cache over a control interface, or
   encapsulated with an IP header using an IP address of the selected network cache as a destination and sent through the TO-SELECTED-CACHE tunnel.

8. The method of claim 6, wherein in the step of encapsulating the decapsulated terminal request, a to-cache tunnel mapped to the flow related to the terminal request in the mapping table is selected as the TO-SELECTED-CACHE tunnel, and the decapsulated terminal request is encapsulated using the cache identifier of the TO-SELECTED-CACHE tunnel.

9. The method of claim 1,
   wherein the mapping table includes information regarding
      one or more from-cache tunnels for use by the TGW to receive tunnel messages from the one or more network caches, each from-cache tunnel being identifiable through a combination of a cache identifier and a from-cache tunnel identifier, and
      one or more to-upper tunnels for use by the TGW to send tunnel messages to one or more upper endpoints located above the TGW, each to-upper tunnel being identifiable through a combination of an upper endpoint identifier and a to-upper tunnel identifier,
   wherein the mapping table is arranged such that each from-cache tunnel is mapped to one of the one or more to-upper tunnels,
   wherein the method further comprises:
      receiving, at the TGW, a redirected terminal request from a redirect network cache through a FROM-REDIRECT-CACHE tunnel, the FROM-REDIRECT-CACHE tunnel being one of the from-cache tunnels whose cache identifier identifies the redirect network cache;
      selecting, at the TGW, from the mapping table, a to-upper tunnel mapped to the FROM-REDIRECT-CACHE tunnel as a TO-UL tunnel; and
      forwarding, at the TGW, the redirected terminal request through the TO-UL tunnel to an uplink (UL) endpoint identified by the upper endpoint identifier of the TO-UL tunnel.

10. The method of claim 1, wherein the method further comprises:
   receiving, at the TGW, downlink data traffic of a flow through a FROM-UL tunnel from a UL endpoint located above the TGW;
   selecting, at the TGW, a to-cache tunnel that is mapped to the flow related to the received downlink data traffic as a TO-REDIRECT-CACHE tunnel; and
   redirecting, at the TGW, the received downlink data traffic through the TO-REDIRECT-CACHE tunnel to a redirect network cache identified by the cache identifier of the TO-REDIRECT-CACHE tunnel.

11. The method of claim 1, further comprising:
   detecting, at the TGW, an occurrence of a mobility event of a mobility terminal, the mobility event occurring when the mobility terminal's network access is switched from an old lower endpoint to a new lower endpoint, data traffic for the mobility terminal being handled by an old network cache prior to the mobility event;
   determining, at the TGW, whether the old network cache should continue handling the data traffic for the mobility terminal based on the mobility event;
   notifying, at the TGW, the old network cache of the change from the old lower endpoint to the new lower endpoint when it is determined that the old network cache should continue handling the data traffic for the mobility terminal; and
   updating, at the TGW, the mapping table to reflect mapping of a new from-lower tunnel, the lower endpoint identifier of the new from-lower tunnel identifying the new lower endpoint, and the from-lower tunnel identifier of the new from-lower tunnel corresponding to a new bearer established for the mobility terminal.

12. The method of claim 11, wherein when there is an ongoing active session for the mobility terminal, it is determined that the old network cache should continue handling the data traffic for the mobility terminal.

13. The method of claim 11, wherein in the step of notifying the old network cache of the change, uplink packets related to a flow of the mobility terminal are encapsulated based on the from-lower tunnel identifier of the new from-lower tunnel using an IP address of the old network cache as a destination, and the encapsulated uplink packets are sent to the old network cache through the to-cache tunnel used by the TGW to send tunnel messages to the old network cache.

14. The method of claim 11, further comprising:
   determining, at the TGW, whether a new network cache is more optimal relative to the old network cache to handle traffic for the mobility terminal based on a location of the mobility terminal; and
   selecting, at the TGW, the new network cache, updating the mapping table, and notifying the new network cache when it is determined that the new network cache is more optimal,
   wherein in the step of updating the mapping table, the mapping table is
      updated to reflect a mapping of a new from-lower tunnel, the lower endpoint identifier of the new from-lower tunnel identifying the new lower endpoint, the from-lower tunnel identifier of the new from-lower tunnel corresponding to a new bearer established for the mobility terminal,
      updated to map the new from-lower tunnel to the new network cache, and
      marked such that all data traffic of flows related to the mobility terminal existing prior to the mobility event are handled by the old network cache and data traffic of flows related to the mobility terminal created subsequent to the mobility event are handled by the new network cache, and
   wherein in the step of notifying the new network cache, the new network cache is provided with new downlink parameters including the lower endpoint identifier and the from-lower tunnel identifier of the new from-lower tunnel.

15. The method of claim 1, wherein the TGW is an old SWG, the method further comprising:
   detecting, at the TGW, an occurrence of a mobility event of a mobility terminal, the mobility event occurring when the mobility terminal's network access is switched from an old lower endpoint to a new lower endpoint, the old and new endpoints both being below the TGW, and data traffic for the mobility terminal being handled by an old network cache prior to the mobility event;

determining, at the TGW, whether the mobility event involves a relocation to a new TGW;

determining, at the TGW, whether the old network cache should continue handling the data traffic for the mobility terminal based on the mobility event when it is determined that the relocation to the new TGW is involved; and notifying, at the TGW, the new TGW when it is determined that the old network cache should continue to handle data traffic for the mobility terminal, wherein in the step of notifying the new TGW, the new TGW is provided with a lower endpoint identifier identifying the lower endpoint of a new to-lower tunnel and a new to-lower tunnel identifier corresponding to a new bearer established for the mobility terminal.

16. The method of claim 1, wherein in the mapping table, the TGW is mapped to a plurality of network caches.

17. A tunnel gateway (TGW) of an access network, comprising a tunnel switch arranged to:

receive a terminal request directed to a data server for a flow, the terminal request originating from a requesting terminal and forwarded to the TGW by a downlink (DL) endpoint through a FROM-DL tunnel, the DL endpoint being an endpoint of the FROM-DL tunnel, select, based on the FROM-DL tunnel, a network cache to handle the flow, and redirect the terminal request to the selected network cache through a TO-SELECTED-CACHE tunnel, the selected network cache being an endpoint of the TO-SELECTED-CACHE tunnel, wherein a mapping table associated with the TGW includes information regarding one or more from-lower tunnels for use by the TGW to receive tunnel messages from one or more lower endpoints located below the TGW, each from-lower tunnel being identifiable through a combination of a lower endpoint identifier and a from-lower tunnel identifier, and the from-lower tunnel identifier allowing a bearer of a flow associated with that from-lower tunnel to be differentiated from a bearer of a flow associated with another from-lower tunnel, one or more network caches capable of providing data to the one or more lower end points, one or more to-cache tunnels for use by the TGW to send tunnel messages to the one or more network caches, each to-cache tunnel being identifiable through a combination of a cache identifier and a to-cache tunnel identifier, and one or more flows for handling by the one or more network caches, wherein for each lower endpoint, there is a corresponding data path between that lower endpoint and an IP point of presence, that lower end point being located below the IP point of presence in that data path, and the TGW being located in between that lower endpoint and the IP point of presence in that data path, wherein the mapping table is arranged such that each from-lower tunnel is mapped to one of the one or more network caches, and such that each of the one or more flows is mapped to one of the one or more to-cache tunnels, wherein the FROM-DL tunnel is one of the one or more from-lower tunnels whose lower endpoint identifier identifies the DL endpoint and whose from-lower tunnel identifier is associated with a bearer of the flow related to the terminal request, wherein the TO-SELECTED-CACHE tunnel is one of the one or more to-cache tunnels whose cache identifier identifies the selected network cache and whose to-cache tunnel identifier is associated with the bearer of the flow related to the terminal request, and wherein the tunnel switch is arranged to select a network cache mapped to the FROM-DL tunnel in the mapping table as the selected network cache.

18. The TGW of claim 17, wherein the tunnel switch is further arranged to redirect uplink packets belonging to the flow related to the terminal request to the selected network cache through the TO-SELECTED-CACHE tunnel.

19. The TGW of claim 17, wherein the tunnel switch is further arranged to register the flow related to the terminal request in the mapping table, and map the flow related to the terminal request to the selected network cache in the mapping table, and wherein the registration includes a source, a destination, and a protocol of the flow related to the terminal request.

20. The TGW of claim 17, further comprising a controller arranged to:

detect an attach or a bearer setup process occurring for an attaching terminal, choose a network cache among the one or more network caches based on one or more considerations related to one or more tunnels created for tunnel messages between the attaching terminal and the TGW, and update the mapping table to reflect correspondences between the chosen network cache and the one or more tunnels created for tunnel messages between the attaching terminal and the TGW.

21. The TGW of claim 20, wherein the considerations include any one or more of:

metrics related to routing of traffic between the candidate network caches and a lower endpoint below the TGW providing network access to the attaching terminal, capabilities of the candidate network caches in relation to a subscription type of the attaching terminal, caching policy to be applied for the given subscriber or service, load on the candidate network caches, and availability of the candidate network caches.

22. The TGW of claim 17, wherein in redirecting the terminal request to the selected network cache, the tunnel switch is arranged to:

provide downlink parameters to the selected network cache, decapsulate the terminal request received through the FROM-DL tunnel, encapsulate the decapsulated terminal request based on the selected network cache, and send the encapsulated terminal request to the selected network cache through the TO-SELECTED-CACHE tunnel, wherein the downlink parameters include the lower endpoint identifier of the FROM-DL tunnel and the from-lower tunnel identifier of the FROM-DL tunnel, which identify the DL endpoint and the bearer of the flow related to the terminal request.

23. The TGW of claim 22, wherein in providing the downlink parameters to the selected network cache, the tunnel switch is arranged to:

signal the downlink parameters to the selected network cache over a control interface, or encapsulate the downlink parameters with an IP header using an IP address of the selected network cache as a destination and send the encapsulated downlink parameters through the TO-SELECTED-CACHE tunnel.

24. The TGW of claim 22, wherein in encapsulating the decapsulated terminal request, the tunnel switch is arranged to:
 select a to-cache tunnel mapped to the flow related to the terminal request in the mapping table as the TO-SELECTED-CACHE tunnel, and
 encapsulate the decapsulated terminal request using the cache identifier of the TO-SELECTED-CACHE tunnel.

25. The TGW of claim 17,
 wherein the mapping table includes information regarding
  one or more from-cache tunnels for use by the TGW to receive tunnel messages from the one or more network caches, each from-cache tunnel being identifiable through a combination of a cache identifier and a from-cache tunnel identifier, and
  one or more to-upper tunnels for use by the TGW to send tunnel messages to one or more upper endpoints located above the TGW, each to-upper tunnel being identifiable through a combination of an upper endpoint identifier and a to-upper tunnel identifier,
 wherein the mapping table is arranged such that each from-cache tunnel is mapped to one of the one or more to-upper tunnels, and
 wherein the tunnel switch is further arranged to:
  receive a redirected terminal request from a redirect network cache through a FROM-REDIRECT-CACHE tunnel, the FROM-REDIRECT-CACHE tunnel being one of the from-cache tunnels whose cache identifier identifies the redirect network cache;
  select, from the mapping table, a to-upper tunnel mapped to the FROM-REDIRECT-CACHE tunnel as a TO-UL tunnel; and
  forward the redirected terminal request through the TO-UL tunnel to an uplink (UL) endpoint identified by the upper endpoint identifier of the TO-UL tunnel.

26. The TGW of claim 17, wherein the tunnel switch is further arranged to:
 receive downlink data traffic of a flow through a FROM-UL tunnel from a UL endpoint located above the TGW,
 select a to-cache tunnel that is mapped to the flow related to the received downlink data traffic as a TO-REDIRECT-CACHE tunnel, and
 redirect the received downlink data traffic through the TO-REDIRECT-CACHE tunnel to a redirect network cache identified by the cache identifier of the TO-REDIRECT-CACHE tunnel.

27. The TGW of claim 17,
 wherein the controller is further arranged to:
  detect an occurrence of a mobility event of a mobility terminal, the mobility event occurring when the mobility terminal's network access is switched from an old lower endpoint to a new lower endpoint, data traffic for the mobility terminal being handled by an old network cache prior to the mobility event,
  determine whether the old network cache should continue handling the data traffic for the mobility terminal based on the mobility event, and
  update the mapping table to reflect mapping of a new from-lower tunnel, the lower endpoint identifier of the new from-lower tunnel identifying the new lower endpoint, and the from-lower tunnel identifier of the new from-lower tunnel corresponding to a new bearer established for the mobility terminal, and
 wherein the tunnel switch is arranged to notify the old network cache of the change from the old lower endpoint to the new lower endpoint when it is determined that the old network cache should continue handling the data traffic for the mobility terminal.

28. The TGW of claim 27, wherein the controller is arranged to determine that the old network cache should continue handling the data traffic for the mobility terminal when there is an ongoing active session for the mobility terminal.

29. The TGW of claim 27, wherein in notifying the old network cache of the change, the tunnel switch is arranged to encapsulate uplink packets related to a flow of the mobility terminal based on the from-lower tunnel identifier of the new from-lower tunnel using an IP address of the old network cache as a destination, and send the encapsulated uplink packets to the old network cache through the to-cache tunnel used by the TGW to send tunnel messages to the old network cache.

30. The TGW of claim 27,
 wherein the controller is further arranged to determine whether a new network cache is more optimal relative to the old network cache to handle traffic for the mobility terminal based on a location of the mobility terminal, and
 when it is determined that the new network cache is more optimal, the controller is arranged to:
  select the new network cache,
  update the mapping table to reflect a mapping of a new from-lower tunnel, the lower endpoint identifier of the new from-lower tunnel identifying the new lower endpoint, the from-lower tunnel identifier of the new from-lower tunnel corresponding to a new bearer established for the mobility terminal,
  map the new from-lower tunnel to the new network cache,
  mark such that all data traffic of flows related to the mobility terminal existing prior to the mobility event are handled by the old network cache and data traffic of flows related to the mobility terminal created subsequent to the mobility event are handled by the new network cache, and
  notify the new network cache, the new network cache is provided with new downlink parameters including the lower endpoint identifier and the from-lower tunnel identifier of the new from-lower tunnel.

31. The TGW of claim 17, wherein the controller is further arranged to:
 detect an occurrence of a mobility event of a mobility terminal, the mobility event occurring when the mobility terminal's network access is switched from an old lower endpoint to a new lower endpoint, the old and new endpoints both being below the TGW, and data traffic for the mobility terminal being handled by an old network cache prior to the mobility event,
 determine whether the mobility event involves a relocation to a new TGW;
 determine whether the old network cache should continue handling the data traffic for the mobility terminal based on the mobility event when it is determined that the relocation to the new TGW is involved, and
 notify the new TGW when it is determined that the old network cache should continue to handle data traffic for the mobility terminal, the new TGW being provided with a lower endpoint identifier identifying the lower endpoint of a new to-lower tunnel and a new to-lower tunnel identifier corresponding to a new bearer established for the mobility terminal.

32. The TGW of claim 17, wherein in the mapping table, the TGW is mapped to a plurality of network caches.

33. A non-transitory computer readable medium storing therein program instructions to cause a computer of a tunnel gateway (TGW) to execute a method to implement network caching in an access network, the method comprising:

receiving, at the TGW, a terminal request directed to a data server for a flow, the terminal request originating from a requesting terminal and forwarded to the TGW by a downlink (DL) endpoint through a FROM-DL tunnel, the DL endpoint being an endpoint of the FROM-DL tunnel;

selecting, at the TGW, based on the FROM-DL tunnel, a network cache to handle the flow; and redirecting, at the TGW, the terminal request to the selected network cache through a TO-SELECTED-CACHE tunnel, the selected network cache being an endpoint of the TO-SELECTED-CACHE tunnel, wherein a mapping table associated with the TGW includes information regarding one or more from-lower tunnels for use by the TGW to receive tunnel messages from one or more lower endpoints located below the TGW, each from-lower tunnel being identifiable through a combination of a lower endpoint identifier and a from-lower tunnel identifier, and the from-lower tunnel identifier of that from-lower tunnel allowing a bearer of a flow associated with that from-lower tunnel to be differentiated from a flow associated with another from-lower tunnel, one or more network caches capable of providing data to the one or more lower end points, one or more to-cache tunnels for use by the TGW to send tunnel messages to the one or more network caches, each to-cache tunnel being identifiable through a combination of a cache identifier and a to-cache tunnel identifier, and one or more flows for handling by the one or more network caches, wherein for each lower endpoint, there is a corresponding data path between that lower endpoint and an IP point of presence, that lower end point being located below the IP point of presence in that data path, and the TGW being located in between that lower endpoint and the IP point of presence in that data path, wherein the mapping table is arranged such that each from-lower tunnel is mapped to one of the one or more network caches, and such that each of the one or more flows is mapped to one of the one or more to-cache tunnels, wherein the FROM-DL tunnel is one of the one or more from-lower tunnels whose lower endpoint identifier identifies the DL endpoint and whose from-lower tunnel identifier is associated with a bearer of the flow related to the terminal request, wherein the TO-SELECTED-CACHE tunnel is one of the one or more to-cache tunnels whose cache identifier identifies the selected network cache and whose to-cache tunnel identifier is associated with the bearer of the flow related to the terminal request, and wherein the tunnel switch is arranged to select a network cache mapped to the FROM-DL tunnel in the mapping table as the selected network cache.

34. The non-transitory computer readable medium of claim 33, wherein in the mapping table, the TGW is mapped to a plurality of network caches.

* * * * *

UNITED STATES PATENT AND TRADEMARK OFFICE
CERTIFICATE OF CORRECTION

PATENT NO.        : 8,767,728 B2
APPLICATION NO.   : 13/037705
DATED             : July 1, 2014
INVENTOR(S)       : Mihaly et al.

It is certified that error appears in the above-identified patent and that said Letters Patent is hereby corrected as shown below:

In the Specification

In Column 2, Line 30, delete "Tu interface." and insert -- Iu interface. --, therefor.

In Column 12, Line 51, delete "POW." and insert -- PGW. --, therefor.

In Column 16, Line 52, delete "cache Cl" and insert -- cache C1 --, therefor.

In Column 18, Line 2, delete "cache," and insert -- cache. --, therefor.

Signed and Sealed this
Third Day of March, 2015

Michelle K. Lee
*Deputy Director of the United States Patent and Trademark Office*